(12) United States Patent
Teramura et al.

(10) Patent No.: US 7,791,459 B2
(45) Date of Patent: Sep. 7, 2010

(54) VEHICLE LIGHT CONTROL SYSTEM

(75) Inventors: Eiji Teramura, Okazaki (JP); Yasutoshi Horii, Nagoya (JP)

(73) Assignee: DENSO Corporation, Kariya (JP)

( * ) Notice: Subject to any disclaimer, the term of this patent is extended or adjusted under 35 U.S.C. 154(b) by 247 days.

(21) Appl. No.: 11/906,552

(22) Filed: Oct. 2, 2007

(65) Prior Publication Data
US 2008/0084286 A1 Apr. 10, 2008

(30) Foreign Application Priority Data
Oct. 6, 2006 (JP) ............................. 2006-274144

(51) Int. Cl.
*B60Q 1/00* (2006.01)
(52) U.S. Cl. ..................... 340/438; 362/37; 362/40; 362/41
(58) Field of Classification Search ................ 340/438; 362/37, 40, 41, 42, 43
See application file for complete search history.

(56) References Cited

U.S. PATENT DOCUMENTS

| 4,858,080 | A | * | 8/1989 | Oikawa ....................... 362/466 |
| 5,193,894 | A | * | 3/1993 | Lietar et al. .................. 362/466 |
| 5,645,338 | A | * | 7/1997 | Kobayashi ................... 362/466 |
| 6,049,171 | A | * | 4/2000 | Stam et al. ..................... 315/82 |
| 6,049,749 | A | * | 4/2000 | Kobayashi .................... 701/49 |
| 6,309,094 | B1 | * | 10/2001 | Woerner ....................... 362/539 |
| 6,343,869 | B1 | | 2/2002 | Kobayashi |
| 6,626,564 | B2 | | 9/2003 | Horii et al. |

FOREIGN PATENT DOCUMENTS

| DE | 101 39 152 | 2/2002 |
| DE | 101 64 193 | 7/2002 |
| JP | 62-131837 | 6/1987 |
| JP | 03-014739 | 1/1991 |
| JP | 09-315216 | 12/1997 |
| JP | 10-175478 | 6/1998 |
| JP | 2002-104065 | 4/2002 |
| JP | 2002-225619 | 8/2002 |
| JP | 2006-232161 | 9/2006 |

OTHER PUBLICATIONS

Office action dated Oct. 14, 2009 in corresponding German Application No. 10 2007 047375.5.
Office action dated May 11, 2010 in corresponding Japanese Application No. 2006-275144.

* cited by examiner

*Primary Examiner*—Davetta W Goins
*Assistant Examiner*—Edny Labbees
(74) *Attorney, Agent, or Firm*—Harness, Dickey & Pierce, PLC

(57) ABSTRACT

The vehicle light control system includes a light device emitting an illumination light around an object vehicle on which the vehicle light control system is mounted, an information obtaining device obtaining integrated information including at least vehicle information indicating a behavior of the object vehicle, a control unit including an illumination target candidate setting function of setting a plurality of illumination target candidates which a driver of the object vehicle should pay attention on the basis of the integrated information, the plurality of the illumination target candidates being given a risk degree respectively, and a determination function of selecting an illumination target from among the plurality of the illumination target candidates on the basis of the risk degree, and an actuator device controlling the light device such that the illumination light is emitted in a direction of the illumination target.

16 Claims, 12 Drawing Sheets

VEHICLE LIGHT CONTROL SYSTEM

CROSS-REFERENCE TO RELATED APPLICATION

This application is related to Japanese Patent Application No. 2006-275144 filed on Oct. 6, 2006, the contents of which are hereby incorporated by reference.

BACKGROUND OF THE INVENTION

1. Field of the Invention

The present invention relates to a vehicle light control system for controlling lighting devices mounted on a vehicle.

2. Description of Related Art

It is known to provide a vehicle with a vehicle light control system for controlling lighting devices such as headlights to improve safety during night driving. Some of such vehicle light control systems are so configured as to automatically control a light emission angle of headlights of a vehicle provided with the vehicle light control system (referred to as "object vehicle" hereinafter) in the vehicle height direction (low-beam, or high-beam) while keeping a light emission direction of the headlights towards a driving direction of the object vehicle, when there exists a vehicle running ahead of the object vehicle or an oncoming vehicle (maybe referred to as another vehicle hereinafter) in order to avoid a driver and passengers of another vehicle from dazzling. For example, refer to Japanese Patent Application Laid-open No. 62-131837. And some of such vehicle light control systems are so configured as to control a luminous intensity of headlights of an object vehicle in accordance with a speed of the object vehicle and an ambient brightness, while keeping a light emission direction of the headlights towards a driving direction of the object vehicle. For example, refer to Japanese Patent Application Laid-open No. 03-14739.

Other than the above, there are some that control, when an object vehicle drives on a curved road, light axes of headlights of the object vehicle in a vehicle width direction (in the lateral direction) in accordance with a curvature of the curved road ahead of the object vehicle and a steering angle of the object vehicle such that the headlights of the object vehicle emit light along the driving direction of the object vehicle. For example, refer to Japanese Patent Application Laid-open No. 2002-104065.

However, the above described conventional vehicle light control systems have a problem in that since they are configured to control the light emission from the headlights optimally at a certain condition, they cannot always properly control the light emission from the headlights at other conditions.

For example, in the vehicle light control system disclosed in Japanese Patent Application Laid-open No. 2002-104065, since it is configured to perform a control of the light emission direction only when the object vehicle is driving on a curved road, and accordingly the light emission direction is not controlled when the object vehicle is driving on a straight road, it is likely that the headlights of the object vehicle do not emit light in a direction to which the driver of the object vehicle should pay attention, for example, a direction from which another vehicle may come out, or a direction at which pedestrians may be standing.

Accordingly, it is strongly desired to provide a vehicle light control system that can properly control the light emission direction under wide-ranging conditions.

SUMMARY OF THE INVENTION

The present invention provides a vehicle light control system comprising:

a light device emitting an illumination light around an object vehicle on which the vehicle light control system is mounted;

an information obtaining device obtaining integrated information including at least vehicle information indicating a behavior of the object vehicle;

a control unit including an illumination target candidate setting function of setting a plurality of illumination target candidates which a driver of the object vehicle should pay attention on the basis of the integrated information, the plurality of the illumination target candidates being given a risk degree respectively, and a determination function of selecting an illumination target from among the plurality of the illumination target candidates on the basis of the risk degree; and an actuator device controlling the light device such that the illumination light is emitted in a direction of the illumination target.

The present invention also provides a vehicle light control system comprising:

a light device including at least one light source emitting an illumination light around an object vehicle on which the vehicle light control system is mounted, a light axis of the light source and intensity of the illumination light being controllable;

an information obtaining device obtaining integrated information including at least behavior information indicating a behavior of the object vehicle; and an actuator device controlling the light device on the basis of the integrated information obtained by the information obtaining device such that the illumination light is emitted in a light emitting aspect in accordance with the behavior of the object vehicle.

The present invention also provides a vehicle light control system comprising:

a light device emitting an illumination light around an object vehicle on which the vehicle light control system is mounted;

an information obtaining device including a vehicle information obtaining function of obtaining information indicating a behavior of the object vehicle and an intersection information obtaining function of obtaining intersection information indicating at least a position and a configuration of an intersection on a driving road which the object vehicle is driving on, the vehicle information and the intersection information constituting integrated information;

a control unit including an illumination target setting function of setting, when the integrated information indicates that the vehicle has entered an area predetermined for the intersection, a direction of an intersection entrance of a crossing road with which the driving road intersects at the intersection as an illumination target; and an actuator device controlling the light device such that the illumination light is emitted in a direction of the illumination target set by the illumination target setting function.

The present invention also provides a vehicle light control system comprising:

a light device emitting an illumination light around an object vehicle on which the vehicle light control system is mounted;

an information obtaining device including a vehicle information obtaining function of obtaining information indicating a behavior of the object vehicle and an intersection information indicating at least a position and a configuration of an intersection on a driving road which the object vehicle is driving on, the vehicle information and the intersection information constituting integrated information;

a control unit including an illumination target setting function of setting, when the integrated information indicates that the vehicle is making or intending to make a right turn in the intersection, a direction of an oncoming lane of the driving road as an illumination target; and an actuator device controlling the light device such that the illumination light is emitted in a direction of the illumination target set by the illumination target setting function.

The present invention also provides a vehicle light control system comprising:

a light device emitting an illumination light around an object vehicle on which the vehicle light control system is mounted;

an information obtaining device including a vehicle information obtaining function of obtaining behavior information indicating a behavior of the object vehicle and a direction-change-information obtaining function of obtaining direction change information indicating a new direction to which the vehicle can change, the vehicle information and the direction change information constituting integrated information;

a control unit including an illumination target setting function of setting a direction of the new direction as an illumination target when the integrated information indicates that the object vehicle is intending to change directions; and an actuator device controlling the light device such that the illumination light is emitted in a direction of the illumination target set by the illumination target setting function.

According to the present invention, it is possible to provide a vehicle with a vehicle light control system that can appropriately control light emission directions of light devices of the vehicle such as headlights under wide-ranging conditions.

Other advantages and features of the invention will become apparent from the following description including the drawings and claims.

PREFERRED EMBODIMENTS OF THE INVENTION

Figure 1:
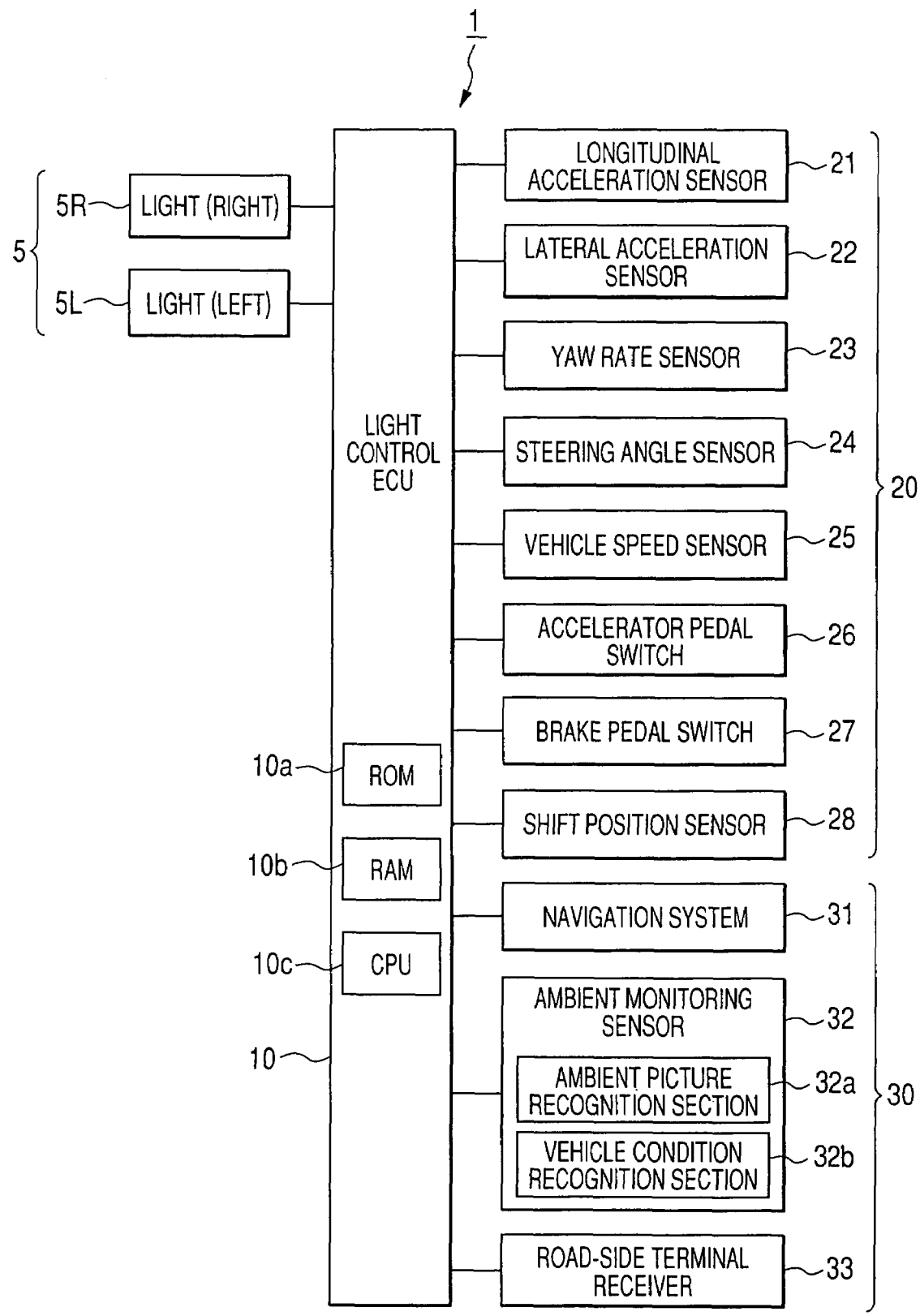
FIG. 1 is a block diagram showing an overall structure of a vehicle light control system according to an embodiment of the invention.

FIG. 1 is a block diagram showing an overall structure of a vehicle light control system 1 according to an embodiment of the invention.

In the following, a vehicle in which the vehicle light control system 1 is mounted is referred to as an object vehicle. The vehicle light control system 1 includes a light device 5 for illuminating an area ahead of or around the object vehicle, a sensor group 20 for detecting behavior of the object vehicle, an information obtaining device group 30 for obtaining information concerning conditions around the object vehicle, and a light control ECU (electronic control unit) 10 for controlling the light device 5 on the basis of the behavior of the object vehicle detected by the sensor group 20 and the information obtained by the information obtaining device group 30.

The light device 5 includes a plurality of (two in this embodiment) light sources respectively mounted at the front corners of the object vehicle to be used as headlights. Hereinafter, the light source mounted at the left front corner is referred to as a light 5L, and the light source mounted at the right front corner is referred to as a light 5R. The lights 5L, 5R are configured to increase intensity of light which they emit (that is, their luminous intensity) with increase of currents applied thereto.

Each of the lights 5L, 5R is linked to an actuator which enables adjusting the angle of the light axis thereof not only in the vehicle height direction (low-beam, or high-beam), but also in the vehicle width direction (swivel direction) so that the lights 5L, 5R can illuminate not only a forward area of the object vehicle but also a sideward area and a backward area of the object vehicle. Accordingly, the light control performed by the vehicle light control system 1 includes driving the actuators to adjust the light axes of the lights 5L, 5R, and controlling the luminous intensities of the lights 5L, 5R.

The sensor group 20 includes a longitudinal acceleration sensor 21 detecting an acceleration of the object vehicle in the driving direction (longitudinal direction), a lateral acceleration sensor 22 detecting an acceleration of the object vehicle in the lateral direction, a yaw rate sensor 23 detecting a yaw rate of the object vehicle, a steering angle sensor 24 detecting an angle of a steering wheel the object vehicle, a vehicle velocity sensor 25 for detecting a velocity of the object vehicle, an accelerator pedal switch 26 detecting manipulation amount (depression amount) of an accelerator pedal, a brake pedal switch 27 detecting manipulation applied to a brake pedal, and a shift position sensor 28 detecting shift position of a shift device of the object vehicle.

The information obtaining device group 30 includes a navigation system 31, an ambient monitoring sensor 32, and a road-side terminal receiver 33. The navigation system 31, which is constituted by a position detector, a map data input device, operation switches, a display, a speaker, etc., has a function of performing a current position display process in which a map around a current position of the object vehicle is displayed, and the current position is marked on the map, a function of performing a route setting process in which a route to a destination is set, a function of performing a lane-change advising process in which a driver of the object vehicle is advised to change directions, and a function of performing a route guide process in which route guide is made by indication in the display or by voice emitted from the speaker in accordance with the route set by the route setting process. The navigation system 31 further includes a function of transmitting, to the light control ECU 10, intersection information including at least a distance to a nearest intersection on the road the object vehicle is driving on (may be referred to as "the driving road" hereinafter), the configuration of this intersection, and data regarding the accident frequency rate at this intersection, right-turn information indicating whether or not a right turn should be made at this intersection if the route guide process is on its way, and lane-change information indicating a predicted position of the object vehicle after lane change if the lane-change advising process is on its way.

The ambient monitoring sensor 32 includes an ambient picture recognition section 32a operating to take pictures of an area around the object vehicle, and analyzing images of the taken pictures, and a vehicle condition recognition section 32b operating to emit radar waves ahead of the vehicle, and recognize conditions of an area ahead of the vehicle on the basis of the received reflected radar waves.

The ambient picture recognition section 32a includes cameras disposed to take pictures of at least a forward area and sideward areas of the object vehicle, and an analyzing section operating to analyze images of the taken pictures, and is configured to extract ambient condition information representing conditions around the object vehicle from the result of the analysis, for example, information indicating whether or not there exists another vehicle around the object vehicle, and to transmit the extracted information to the light control ECU 10.

The vehicle condition recognition section 32b, which is constituted as a FMCW radar, is configured to detect target information (a distance between the object vehicle and an obstacle, a relative speed between the object vehicle and the target, a direction of the target), and transmit the target information to the light control ECU 10.

The light control ECU 10 is constituted mainly by a ROM 10a storing programs or the like, a RAM 10b temporarily storing data, and a CPU 10c executing instructions in accordance with the programs stored in the ROM 10a.

The light control ECU 10 determines a light emission direction (or the swivel angle) as an illumination target, a light emission angle in the vehicle height direction, and an illumination control value indicative of a luminous intensity for each of the light 5L and light 5R on the basis of detection results of the sensor group 20 and information obtained by the information obtaining device group 30, and performs a light control process on the light 5L and light 5R in accordance with the determinations. Next, explanation is made as to the light control process performed by the CPU 10c of the light control ECU 10.

Figure 2:
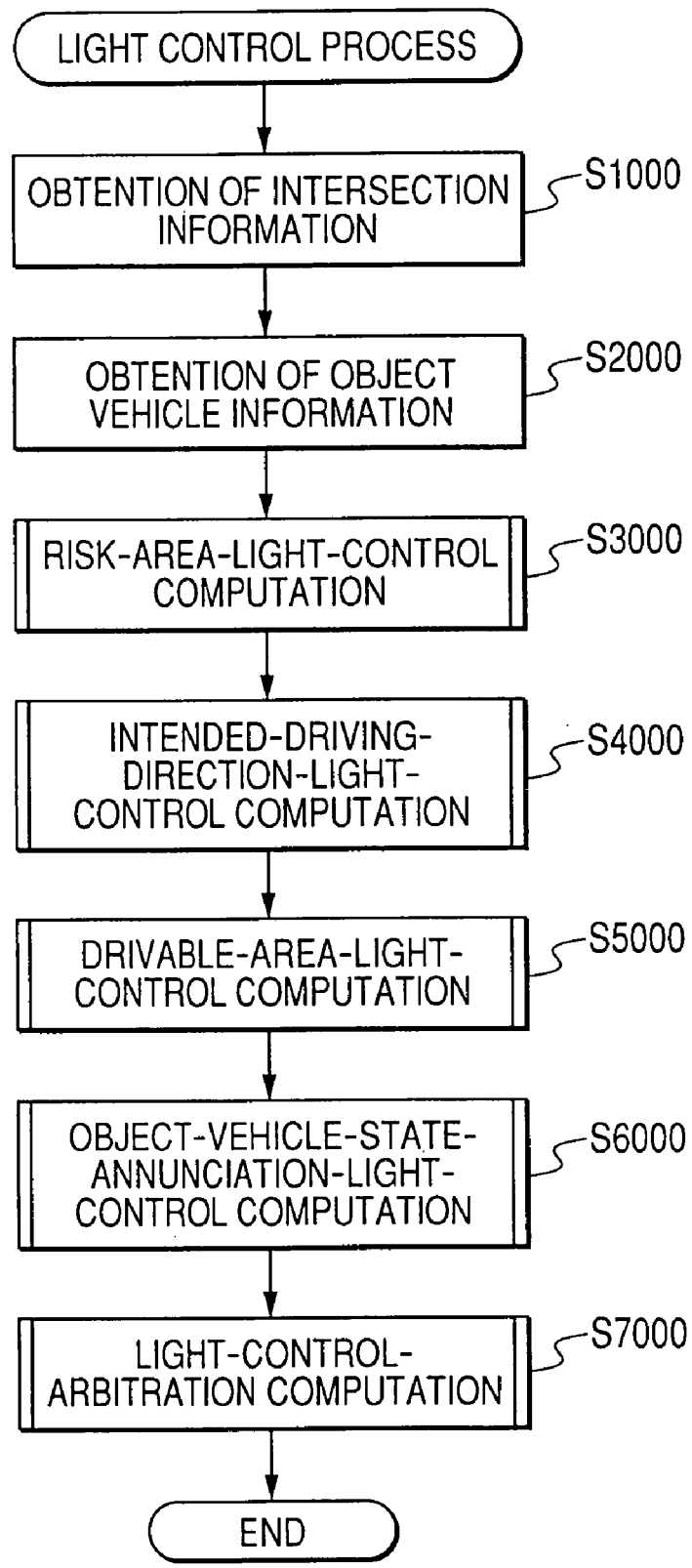
FIG. 2 is a flowchart showing control steps of a light control process performed by the vehicle light control system.

FIG. 2 is a flowchart showing control steps of the light control process. The light control process, which is triggered when the lights 5L, 5R are lit, begins by obtaining the intersection information from the navigation system 31 at step S1000.

Subsequently, object vehicle information regarding the behavior of the object vehicle is obtained from the sensor group 20 at step S2000. Next, at step S3000, a risk-area-light-control computation is performed on the basis of the intersection information obtained at step S1000 and the object vehicle information obtained at step S2000 in order to set, as a first illumination target (s_risk), a direction in which there is a possibility of existence of an obstacle that may collide with the object vehicle.

At step S4000, an intended driving direction of the object vehicle is estimated on the basis of the object vehicle information obtained at step S2000, and then an intended-driving-direction-light-control computation is performed in order to set this intended driving direction as a second illumination target (s_driving).

At step S5000, an intended turning direction is estimated on the basis of the information obtained from the information obtaining device group 30 and the sensor group 20, and then a drivable-area-light-control computation is performed in order to set this intended turning direction as a third illumination target (s_ability).

At step S6000, there is performed an object-vehicle-state-annunciation-light-control computation in which an illumination control value (s_host) is set on the basis of the information including the object vehicle information obtained at step S2000. At step S7000, there is performed a light-control-arbitration computation in which the first illumination target (s_risk) set by the risk-area-light-control computation, the second illumination target (s_driving) set by the intended-driving-direction-light-control computation, the third illumination target (s_ability) set by the drivable-area-light-control computation, and the illumination control value (s_host) set by the object-vehicle-state-annunciation-light-control computation are arbitrated in order to determine control target values (swivel angle, light emission angle in the vehicle height direction, illumination intensity) for each of the lights 5L, 5R.

After performing the light control on the lights 5L, 5R such that illumination light is emitted in accordance with the control values determined at step S7000, the light control process returns to step S1000, so that this process is repeated until the lights 5L, 5R are turned off. Next, explanation is made as to the risk-area-light-control computation performed at step S3000.

Figure 3:
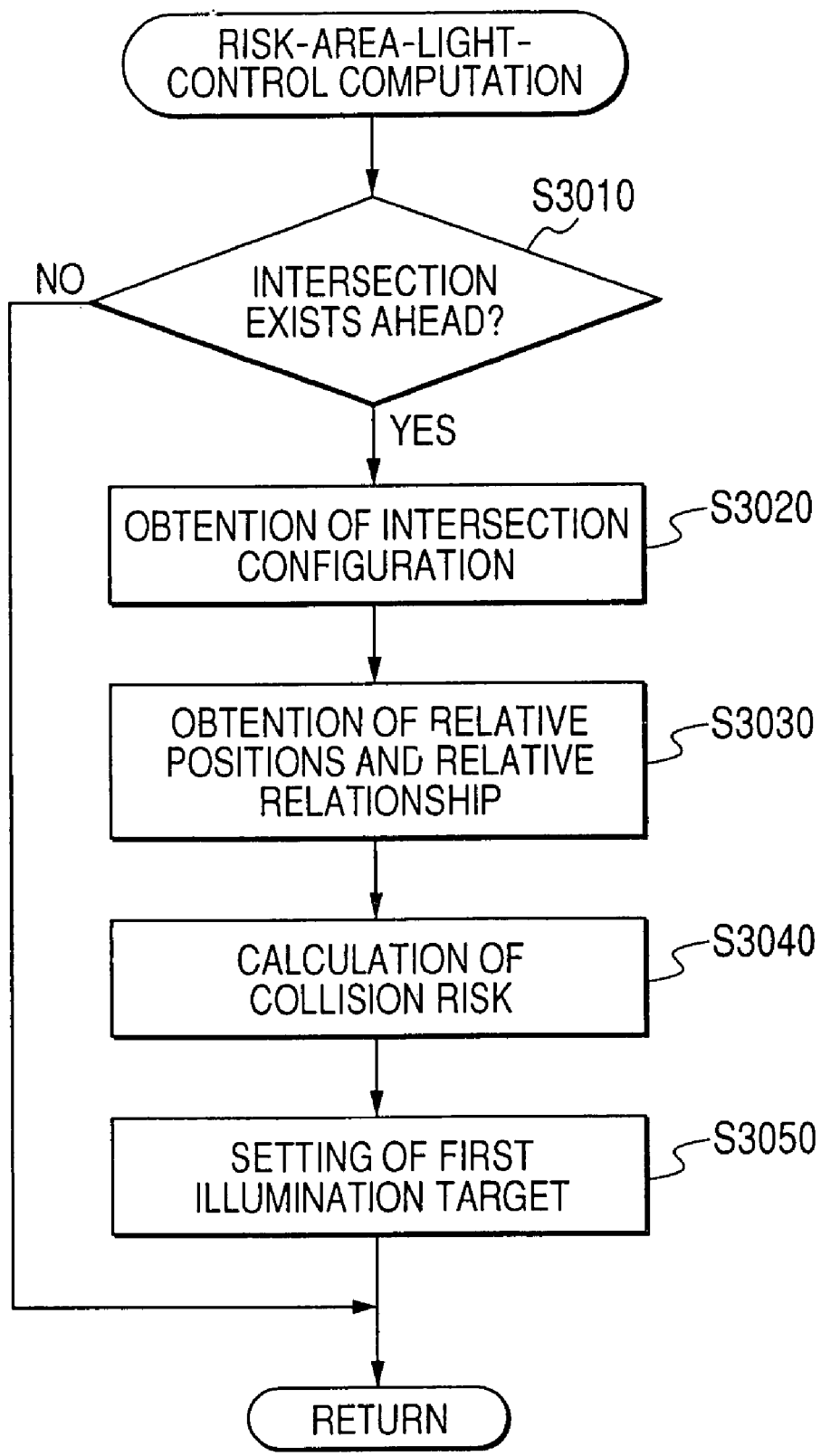
FIG. 3 is a flowchart showing control steps of a risk-area-light-control computation included in the light control process shown in FIG. 2.

FIG. 3 is a flowchart showing control steps of the risk-area-light-control computation. As shown in FIG. 3, the risk-area-light-control computation begins by judging at step S3010 whether or not there is an intersection within a predetermined distance from the object vehicle on the driving road on the basis of the intersection information obtained at step S1000.

If the judgment at step S3010 is affirmative, the computation proceeds to step S3020. At step S3020, information regarding an intersection configuration of the intersection whose existence is detected at step S3010 (may be referred to as "intersection in question" hereinafter) is obtained. Here, the intersection configuration includes configurations of a crossroad intersection, T-shaped intersection, Y-shaped intersection, a junction between a priority road and a non-priority road in an express way, etc.

At step S3030, relative positions between the current position of the object vehicle and the intersection recognized at step S3010, and a relative relationship representing the behavior of the object vehicle relative to this intersection are obtained. The relative relationship is derived from the relative positions and the object vehicle information obtained at step S2000. For example, the relative relationship indicates that the object vehicle is entering the intersecting in question, or moving away from the intersection in question, or making a right or left turn in the intersection in question.

At step S3040, there is calculated a collision risk which represent a probability of collision accident occurrence at this intersection, that is, a value of the possibility that another vehicle or a pedestrian comes close to the object vehicle, or enters the intersection in question.

In more detail, the collision risk is calculated on the basis of whether or not the intersection in question is provided with a traffic light, how the intersection in question is configured, what is the accident occurrence rate at the intersection in question, and whether the driving road is a priority road or a non-priority road. In this embodiment, the calculated collision risk becomes large when the intersection is not provided with a traffic light, when the object vehicle is driving on a non-priority road (that is, when the object vehicle enters the intersection after making a temporary stop), when the accident occurrence rate at the intersection is larger than a predetermined value, or when the speed of the object vehicle is higher than a predetermined speed.

At step S3050, an illumination candidate point is determined from among a plurality of illumination points predetermined depending on the intersection configuration for each of the light 5R and light 5L in accordance with the relative positions and the relative relationship obtained at step S3030, and the value of the collision risk calculated at step S3040. In addition at step S3050, for each of the lights 5R, 5L, the direction of the determined illumination candidate point is set as the first illumination target (s_risk).

In this embodiment, the plurality of the illumination points include intersection entrances (for example, in the case of a crossroad intersection, intersection entrances of a crossing road), an oncoming lane, a position at which a crosswalk enters the intersection, the driving road (the road on which the object vehicle is driving), etc.

In this embodiment, if the relative positions and relative relationship obtained at step S3030 indicate that the object vehicle is entering the intersection (more specifically, that the object vehicle has entered a certain area predetermined for the intersection), and the collision risk is larger than a predetermined threshold, at least some of the intersection entrances of the roads crossing at the intersection are set as the illumination candidate point of one of or both of the lights 5L, 5R.

For example, in a case where the intersection in question is a crossroad intersection, the right side intersection entrance of the crossing road with respect to the driving direction of the object vehicle is set as the illumination candidate point of the light 5R, and the left side intersection entrance of this crossing road with respect to the driving direction of the object vehicle is set as the illumination candidate point of the light 5L. For another example, in a case where the intersection in question is a T-shaped intersection, and the object vehicle is driving straight through this intersection, the intersection entrance of the crossing road is set as the illumination candidate point of one of the lights 5L, 5R, which is closer to this intersection entrance. That is, when the entrance is on the right side with respect to the driving direction of the object vehicle, the entrance is set as the illumination candidate point of the light 5R, and when the entrance is on the left side with respect to the driving direction of the object vehicle, the entrance is set as the illumination candidate point of the light 5L.

In addition, in this embodiment, if the relative positions and the relative relationship obtained at step S3030 indicate that another vehicle is making a right turn or intending to make a right turn at the intersection in question (at a crossroad intersection, for example), and the collision risk is larger than the predetermined threshold, the oncoming lane is set as the illumination candidate point of the light 5L, and the right side entrance of the crossing road is set as the illumination candidate point of the light 5R.

After that, a priority used to determine an illumination target in the light-control-arbitration computation, which is calculated for each of the lights 5L, 5R, is given to corresponding one of the first illumination targets (s_risk) set at step S3050. And then the light control process proceeds to step S4000.

Here, the priority given to the first illumination target (s_risk) is a sum of a first predetermined reference value and an increase value which is increased when the probability of collision accident occurrence is estimated high on the basis of at least one of the collision risk, the behavior of the object vehicle, the relative positions, and the relative relationship.

The increase value is calculated for each of the lights 5L, 5R. And the increase value given to the first illumination target closer to the object vehicle is made large than the increase value given to the first illumination target remoter from the object vehicle. For example, in a case where the object vehicle is entering a left-hand traffic crossroad intersection, the priority given to the first illumination target of the light 5L is larger than that given to the first illumination target of the light 5R when these first illumination targets are the intersection entrances of the crossing road.

That is, the risk-area-light-control computation determines the illumination candidate point from among the illumination points predetermined depending on the intersection configuration for each of the lights 5L, 5R in accordance with the relative positions between the intersection in question and the object vehicle, the relative relationship, and the collision risk. And the priority, which is calculated at a value which increases with the increase of the probability of collision accident occurrence, is given to the first illumination target (s_risk) for each of the lights 5L, 5R. Next, explanation is made as to the intended-driving-direction-light-control computation performed at step S4000.

Figure 4:
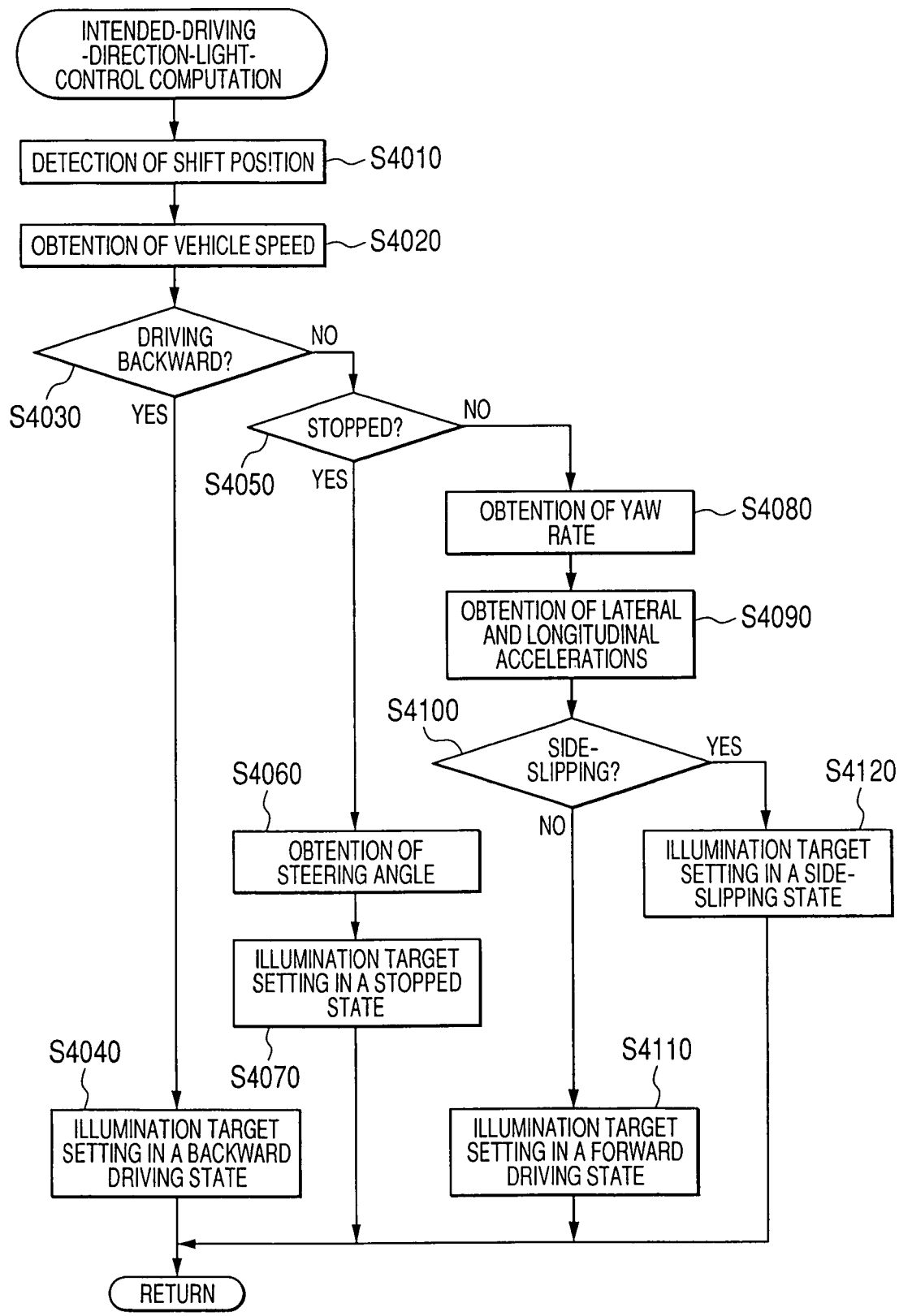
FIG. 4 is a flowchart showing control steps of a intended-driving-direction-light-control computation included in the light control process shown in FIG. 2.

FIG. 4 is a flowchart showing control steps of the intended-driving-direction-light-control computation. The intended-driving-direction-light-control computation begins by extracting a shift position of the object vehicle detected by the shift position sensor 28 from the object vehicle information obtained at step S2000.

Subsequently, at step S4020, a vehicle speed Vn of the object vehicle detected by the vehicle speed sensor 25 is extracted from the object vehicle information. At step S4030, it is judged whether or not the object vehicle is driving backward, or in a reverse driving state. In this embodiment, if the shift position of the object vehicle extracted at step S4010 is in a reverse position, the object vehicle is judged to be in the reverse driving state.

If the judgment at step S4030 is affirmative, the computation proceeds to step S4040 where the driving direction of the object vehicle, that is the backward direction of the object vehicle is set as the second illumination target (s_driving).

In this embodiment, when the object vehicle makes a backward turn, the direction of travel of its outer steering tire is set as the second illumination target (s_driving). More specifically, in this embodiment, when the object vehicle makes a backward right turn, the direction of travel of its right front tyre is set as the second illumination target (s_driving) of the light 5R, and when the object vehicle makes a backward left turn, the direction of travel of its left front tire is set as the second illumination target (s_driving) of the light 5L. However, it should be noted that when the object vehicle makes a backward right (left) turn, although the light 5R (5L) is swivel-controlled by setting the direction of travel of the right (left) front tire as the second illumination target (s_driving) of the light 5R (5L), the second illumination target (s_driving) of the opposite side light 5L (5R) is set to the forward direction of the object vehicle so that the opposite side lamp 5L (5R) is not swivel-controlled.

Thereafter, a second reference value larger than the first reference value is given to the second illumination target (s_driving) as a priority, and then the light control process proceeds to step S5000.

On the other hand, if the judgment at step S4030 is negative, that is, if the object vehicle is judged to be driving forward or stopped, the computation proceeds to step S4050 where it is judged whether or not the object vehicle is in a stopped state. If the judgment at step S4050 is affirmative, the computation proceeds to step S4060. In this embodiment, when the detection result of the vehicle speed sensor 25 indicates that the speed of the object vehicle is lower than a predetermined speed, or the detection result of the shift position sensor 28 indicates that the shift position is in the parking position or neutral position, the object vehicle is judged to be in the stopped state.

At subsequent step S4060, a steering angle detected by the steering angle sensor 24 is extracted from the object vehicle information. And then the computation proceeds to step S4070 where a forward driving direction of the object vehicle is estimated on the basis of the steering angle obtained at step S4060, and this estimated forward driving direction is set as the second illumination target (s_driving) for each of the lights 5L, 5R. In this embodiment, the steering angle obtained at step S4060 is set as a swivel angle.

After that, the second reference value larger than the first reference value is given as a priority to the second illumination target (s_driving) set at step S4070, and then the light control process proceeds to step S5000.

If it is judged at step S4050 that the object vehicle is not in the stopped state, that is, if it is judged that the object vehicle is driving forward at a speed higher than the predetermined speed, the computation proceeds to step S4080

At step S4080, a yaw rate β detected by the yaw rate sensor 23 is extracted from the object vehicle information, and at subsequent step S4090, accelerations of the object vehicle detected by the longitudinal acceleration sensor 21 and the lateral acceleration sensor 22 are extracted from the object vehicle information. And then the computation proceeds to step S4100.

As step S4100, it is judged whether or not the object vehicle is side-slipping or skidding. In this embodiment, a slip angle of the object vehicle is calculated on the basis of the speed, longitudinal acceleration, and lateral acceleration of the object vehicle. And if the calculated slip angle is larger than a predetermined angel, it is judged that the object vehicle is side-slipping.

If the judgment at step S4100 is negative, the computation proceeds to step S4110 where an index R (=Vn/β) representing a degree of curve movement of the object vehicle is calculated on the basis of the speed Vn of the object vehicle obtained at step S4020 and the yaw rate β of the object vehicle obtained at step S4080. In addition, at step S4110, a position of the object vehicle three seconds after the current time is predicted, and the direction to the predicted position is set as the second illumination target (s_driving).

Subsequently, the second reference value larger than the first reference value is given to the second illumination target (s_driving) set at step S4110 as a priority, and then the light control process proceeds to step S5000.

On the other hand, if the judgment at step 4100 is affirmative, the computation proceeds to step S4120 where a position of the object vehicle three seconds after the current time is predicted on the basis of the slip angle and the yaw-rate β calculated at step S4100, and the direction to the predicted position is set as the second illumination target (s_driving).

After that, the second illumination target (s_driving) set at step S4120 is given a priority larger than other priorities given to other illumination targets so that this second illumination target has a higher priority than any other illumination targets. And then the light control process proceeds to step S5000.

As understood from the above, the intended-driving-direction-light-control computation sets the direction in which the object vehicle is intending to drive as the second illumination target (s_driving) on the basis of the behavior of the object vehicle. Next, explanation is made as to the drivable-area-light-control computation performed at step S5000 of the light control process.

Figure 5:
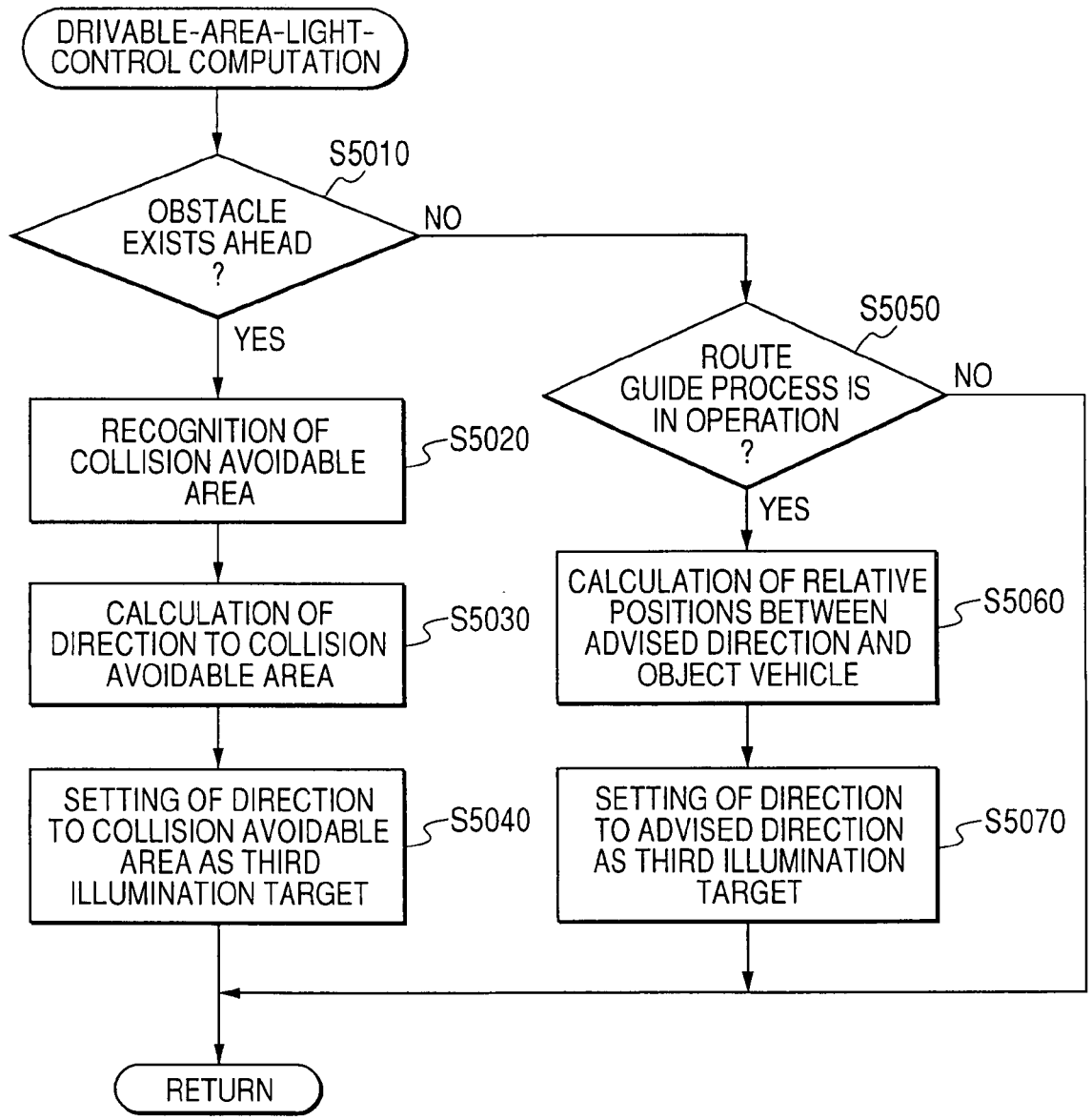
FIG. 5 is a flowchart showing control steps of a drivable-area-light-control computation included in the light control process shown in FIG. 2.

FIG. 5 is a flowchart showing control steps of the drivable-area-light-control computation. This drivable-area-light-control computation begins by obtaining driving direction information indicating conditions of the driving road in the driving direction of the object vehicle from the ambient monitoring sensor 32, and judging whether or not there exists an obstacle in the driving direction (in the forward direction of the object vehicle) on the basis of the obtained driving direction information at step S5010.

In this embodiment, conditions ahead of the object vehicle are recognized from the ambient condition information obtained by the ambient picture recognition section 32a and the target information obtained by the vehicle condition recognition section 32b. If the recognized conditions indicate that another vehicle is stopped or driving at a slow speed ahead of the object vehicle, it is judged that there exists an obstacle.

If the judgment at step S5010 is affirmative, the computation proceeds to step S5020 to obtain information regarding a collision avoidable area to avoid collision with the obstacle recognized at step S5010. In this embodiment, an area having a predetermined size large enough for the object vehicle to go therein is detected around the obstacle recognized at step S5010, and this detected area is recognized as the collision avoidable area.

For example, in a case where the object vehicle is driving on a road including a plurality of lanes such as a cruising lane and a passing lane in an express highway, when there exists an obstacle on the cruising lane, a roadside of this road is recognized as the collision avoidable area if this road is not provided with a guardrail, and another vehicle is not there, and otherwise, the passing lane is recognized as the collision avoidable area.

At subsequent step S5030, a course which the object vehicle should follow to move to the collision avoidable area is calculated. That is, the relative positions between the object vehicle and the collision avoidable area are calculated.

At step S5040, a direction from the object vehicle to the collision avoidable area is determined on the basis of the relative positions calculated at step S5030, and this direction is set as the third illumination target (s_ability).

Thereafter, the third illumination target (s_ability) is given a priority which is equal to a sum of the first reference value, and the increase value calculated at a value that increases with the increase of the probability of collision accident occurrence on the basis of at least one of the behavior of the object vehicle, the ambient condition information and the target information. And then the light control process proceeds to step S6000.

On the other hand, if the judgment at step S5010 is negative, the computation proceeds to step S5050. At step S5050, it is judged whether or not an advice to change directions (lane change, or right or left turn) is being indicated as a consequence of that the route guide process or lane-change process has been performed by the navigation system. If the judgment at step S5060 is affirmative, the computation proceeds to step S5060.

At step S5060, new-direction information including information regarding a position of the object vehicle in accordance with a new direction being advised by the navigation system 31 is obtained from this navigation system 31 to calculate relative positions between the advised direction and the object vehicle (front of the object vehicle).

At step S5070, a direction toward the advised direction from the object vehicle is calculated on the basis of the relative positions therebetween calculated at step S5060, and this calculated direction is set as the third illumination target (s_ability).

Thereafter, the third illumination target (s_ability) is given a priority which is equal to a sum of the first reference value, and a increase value calculated at a value that increases with the increase of the probability of collision accident occurrence on the basis of at least one of the behavior of the object vehicle, the new-direction information, the ambient condition information and the target information. For example, the increase value is made large when traffic heavy in the advised direction. Thereafter, the light control process proceeds to step S6000.

If the judgment at step S5050 is negative, the forward driving direction of the object vehicle is set as the third illumination target (s_ability), and this third illumination target (s_ability) is given the first reference value as a priority. And then, the light control process proceeds to step S6000.

As explained above, the drivable-area-light-control computation sets the collision avoidable area as the third illumination target (s_ability) if there exists an obstacle on the course of the object vehicle, and if the navigation system 31 is advising a new direction, the drivable-area-light-control computation sets this advised direction as the third illumination target (s_ability). Next, explanation is made as to the object-vehicle-state-annunciation-light-control computation performed at step S6000 of the light control process.

Figure 6:
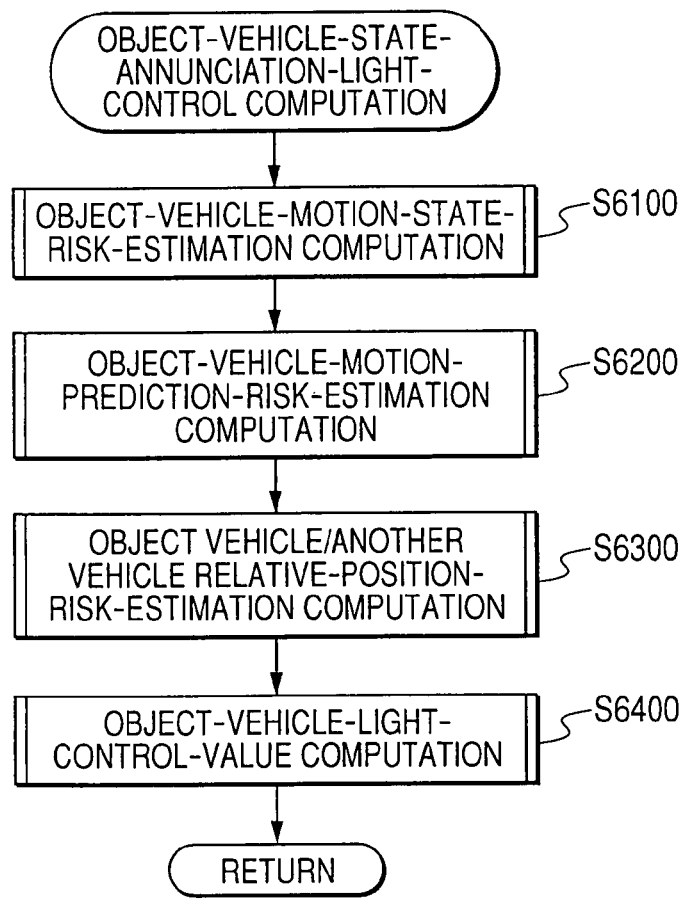
FIG. 6 is a flowchart showing control steps of an object-vehicle-state-annunciation-light-control computation included in the light control process shown in FIG. 2.

FIG. 6 is a flowchart showing control steps of the object-vehicle-state-annunciation-light-control computation. This object-vehicle-state-annunciation-light-control computation begins by performing at step S6100 an object-vehicle-motion-state-risk-estimation computation to calculate an object-vehicle-motion-state risk indicating a value of the possibility of occurrence of an accident due to the behavior of the object vehicle on the basis of the object vehicle information obtained at step S2000.

Subsequently, at step S6200, a prediction behavior of the object vehicle is estimated on the basis of the object vehicle information obtained at step S2000, and then an object-vehicle-motion-prediction-risk-estimation computation is performed to calculate an object-vehicle-motion-prediction risk indicative of the value of the possibility of occurrence of an accident on the basis of the estimated prediction behavior of the object vehicle.

At step S6300, there is obtained relative positions between the object vehicle and another vehicle existing around the object vehicle on the basis of the information obtained by the information obtaining device group 30, and the object vehicle information obtained at step S2000, and then an object vehicle/another vehicle relative-position-risk-estimation computation is performed to calculate an object vehicle/another vehicle relative position risk indicative of the value of the possibility of occurrence of an accident on the basis of the obtained relative positions.

Subsequently, at step S6400, an object-vehicle-light-control-value computation is performed to set the illumination control value (s_host) on the basis of the object-vehicle-motion-state risk calculated at step S6100, the object-vehicle-motion-prediction risk calculated at step S6200, and the object vehicle/another vehicle relative position risk calculated at step S6300.

Thereafter, the light control process proceeds to step S7000. Next, explanation is made as to the object-vehicle-motion-state-risk-estimation computation.

Figure 7:
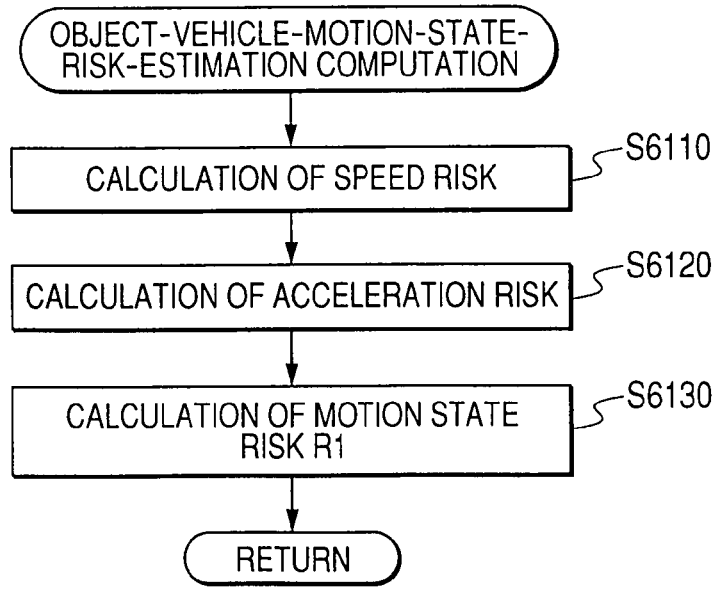
FIG. 7 is a flowchart showing control steps of an object-vehicle-motion-state-risk-estimation computation included in the object-vehicle-state-annunciation-light-control computation shown in FIG. 6.

FIG. 7 is a flowchart showing control steps of the object-vehicle-motion-state-risk-estimation computation, and FIG. 8 is a diagram schematically showing a relationship between the behavior of the object vehicle and the object-vehicle-motion-state risk.

This object-vehicle-motion-state-risk-estimation computation begins by calculating the object-vehicle-motion-state risk which depends on the speed of the object vehicle (may be referred to as "speed risk" hereinafter) at step S6110.

Figure 8A:
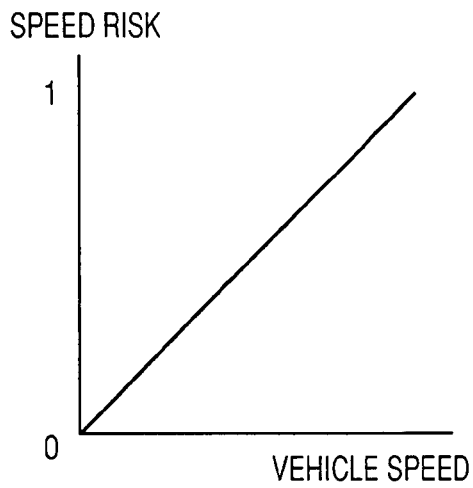
FIGS. 8A and 8B are graphs each schematically showing a relationship between the behavior of an object vehicle provided with the vehicle light control system and a motion state risk used for risk estimation on the basis of the behavior of the object vehicle.
Figure 8B:
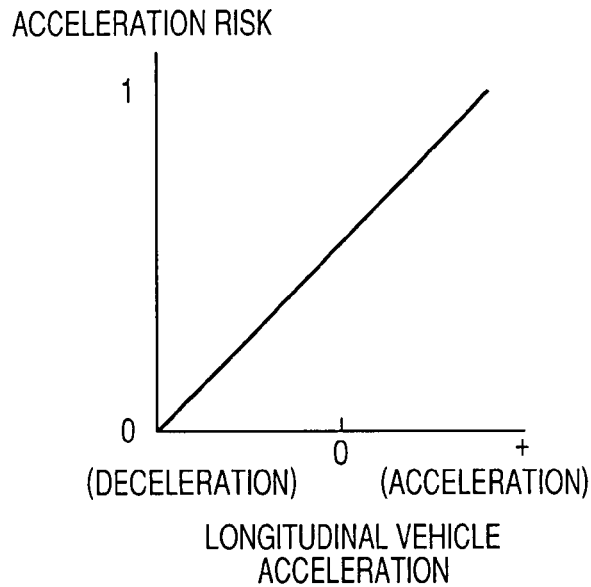

In this embodiment, since the risk of occurrence of an accident increases with the increase of the speed of the object vehicle, the speed risk is determined by referring to a graph shown in FIG. 8A in which the speed risk and the speed of the object vehicle are defined as being in a linear relationship.

Subsequently, at step S6120, another object-vehicle-motion-state risk which depends on the acceleration of the object vehicle (may be referred to as "acceleration risk" hereinafter) is calculated. In this embodiment, the acceleration risk is determined by referring to a graph shown in FIG. 8B. As seen from FIG. 8B, the acceleration risk is determined such that it increases as the object vehicle increases its speed in the forward direction, and decreases as the object vehicle increases its speed in the backward direction.

At step S6130, a synthetic object-vehicle-motion-state risk R1 (referred to simply as "motion state risk R1") is calculated from the speed risk calculated at step S6110 and the acceleration risk calculated at step S6120. In this embodiment, a larger one of the speed risk and the acceleration risk is determined to be the motion state risk R1.

Thereafter, the computation proceeds to step S6200. As explained above, the object-vehicle-motion-state-risk-estimation computation determines the motion state risk R1 from the speed and acceleration of the object vehicle.

Next, explanation is made as to the object-vehicle-motion-prediction-risk-estimation computation performed at step

Figure 9:
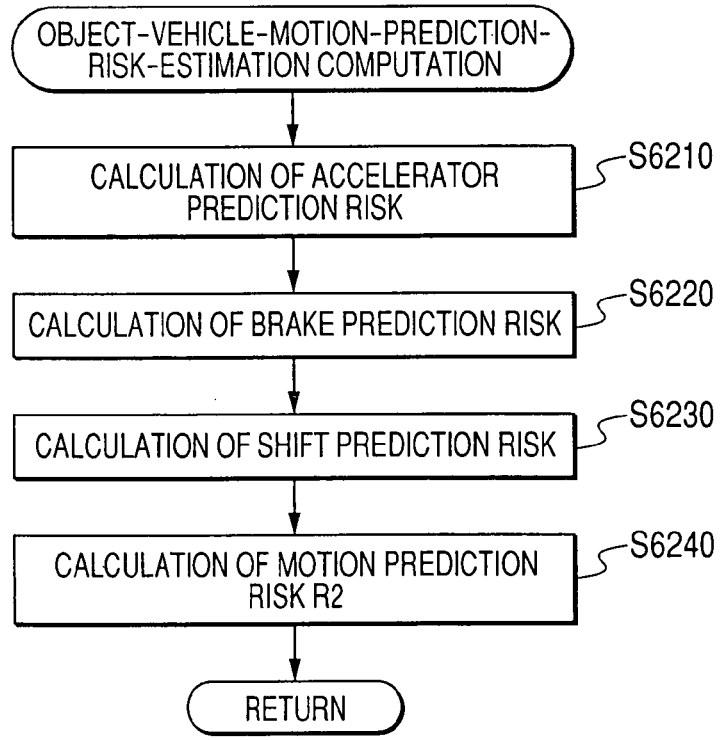
FIG. 9 is a flowchart showing control steps of an object-vehicle-motion-prediction-risk-estimation computation included in the object-vehicle-state-annunciation-light-control computation shown in FIG. 6.

6200. FIG. 9 is a flowchart showing control steps of the object-vehicle-motion-prediction-risk-estimation computation, and FIGS. 10A, 10B, 10C are diagrams each schematically showing a relationship between the object-vehicle-motion-prediction risk and an indicator needed to predict the behavior of the object vehicle.

This object-vehicle-motion-prediction-risk-estimation computation begins by calculating, at step S6210, an object-vehicle-motion-prediction risk (may be referred to as "accelerator prediction risk") corresponding to a prediction behavior of the object vehicle estimated from a manipulation amount (depression amount) of the accelerator pedal.

Figure 10A:
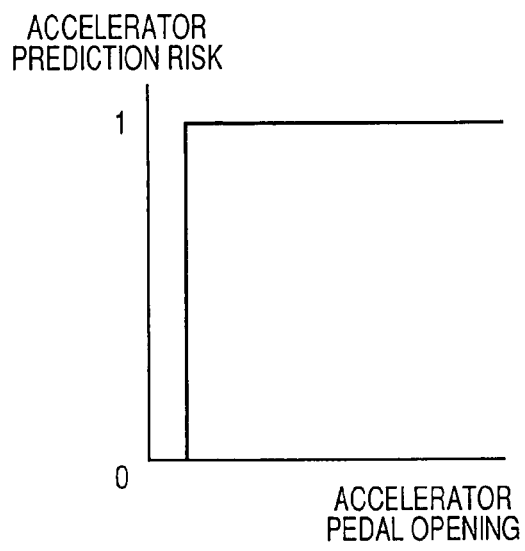
FIGS. 10A, 10B, 10C are graphs each schematically showing a relationship between an object-vehicle-motion-prediction risk and an indicator needed to predict the behavior of the object vehicle.
Figure 10B:
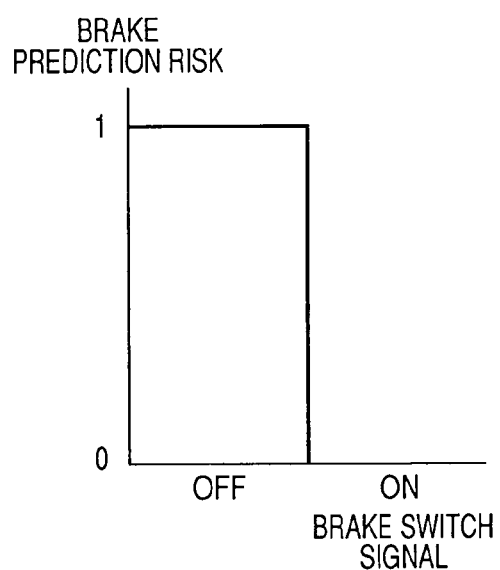
Figure 10C:
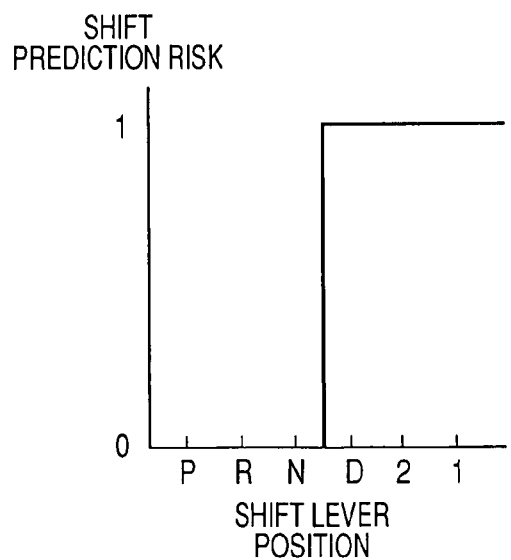

In this embodiment, the accelerator prediction risk is determined by referring to the graph of FIG. 10A defining the relationship between the accelerator prediction risk and the manipulation amount (depression amount) of the accelerator pedal. As seen from FIG. 10A, the accelerator prediction risk is determined such that it increases from zero to a certain value when the manipulation amount (depression amount) of the accelerator pedal exceeds a predetermined threshold. As explained above, the accelerator prediction risk is determined in accordance with the detection result of the accelerator pedal switch 26.

At step S6220, there is calculated an object-vehicle-motion-prediction risk corresponding to a prediction behavior of the object vehicle estimated from the depression amount of the brake pedal of the object vehicle (referred to as "brake prediction risk" hereinafter). In this embodiment, the brake prediction risk is determined by referring to the graph of FIG. 10B defining the relationship between the brake prediction risk and the on/off state of the brake pedal switch 27. As understood from FIG. 10B, the brake prediction risk is determined such that it is at a high level while depression of the brake pedal is not detected. As explained above, the brake prediction risk is determined in accordance with the detection result of the brake pedal switch 27.

At step S6230, there is calculated an object-vehicle-motion-prediction risk corresponding to a prediction behavior of the object vehicle estimated from manipulation of the shift lever (referred to as "shift prediction risk" hereinafter). In this embodiment, the shift prediction risk is determined such that it becomes high when the shift lever is in a position for the object vehicle to move forward (for example, low, or second, or top position in the case of manual transmission, a drive position in the case of automatic transmission. As understood from the above, the shift prediction risk is determined in accordance with the detection result of the shift position sensor 28.

At step S6240, from the accelerator prediction risk calculated at step S6210, the brake prediction risk calculated at step S6220, and the shift prediction risk calculated at step S6230, there is calculated an object-vehicle-motion-prediction risk (referred to as a motion prediction risk R2 hereinafter) is calculated.

In this embodiment, a largest one of the accelerator prediction risk, the brake prediction risk, and the shift prediction risk is determined to be the motion risk R2. Thereafter, the computation proceeds to step S6300.

As explained above, the object-vehicle-motion-prediction-risk-estimation computation estimates a prediction behavior of the object vehicle, and calculates the motion risk R2 from the estimated prediction behavior.

Figure 11:
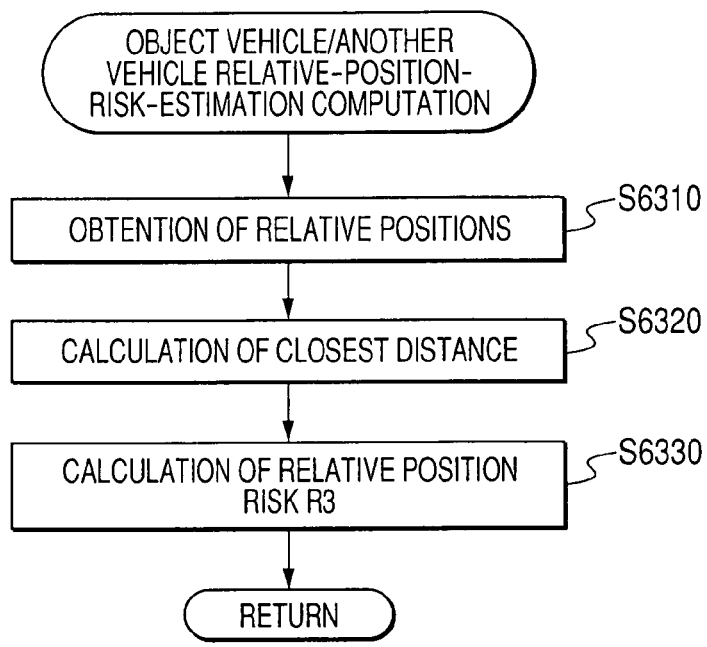
FIG. 11 is a flowchart showing control steps of an object vehicle/another vehicle relative-position-risk-estimation computation included in the object-vehicle-state-annunciation-light-control computation shown in FIG. 6.
Figure 12:
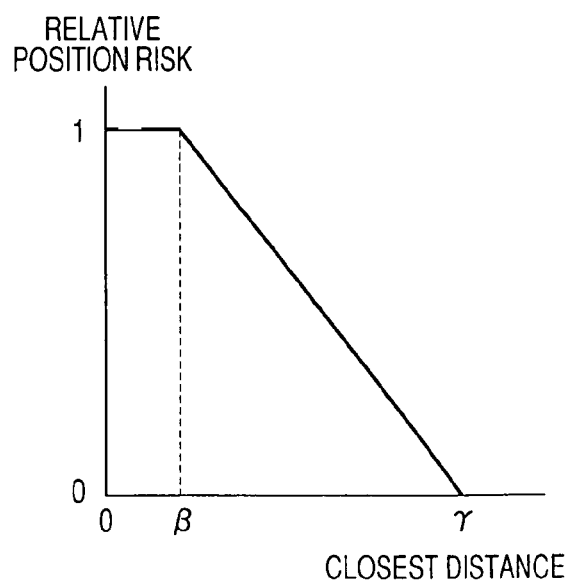
FIG. 12 is a graph showing a relationship between relative positions of the object vehicle and another vehicle (relative distance therebetween) and an object vehicle/another vehicle relative position risk calculated by the object vehicle/another vehicle relative-position-risk-estimation computation.

Next, explanation is made as to the object vehicle/another vehicle relative-position-risk-estimation computation. FIG. 11 is a flowchart showing control steps of the object vehicle/another vehicle relative-position-risk-estimation computation, and FIG. 12 is a graph showing a relationship between the relative positions between the object vehicle and another vehicle when they approach most closely to each other, and the object vehicle/another vehicle relative position risk.

This object vehicle/another vehicle relative-position-risk-estimation computation begins by obtaining, at step S310, the relative positions between the object vehicle and another vehicle from the ambient monitoring sensor 32. If the detection result of the ambient monitoring sensor 32 indicates that there is no other vehicle around the object vehicle, this object vehicle/another vehicle relative-position-risk-estimation computation is terminated.

In this embodiment, the relative positions between the object vehicle and another vehicle are determined on the basis of at least one of the ambient condition information obtained from the ambient picture recognition section 32a, and the target information obtained from the vehicle condition recognition section 32b.

At step S6320, there is calculated a distance between the object vehicle and another vehicle when they approach most closely to each other on the assumption that the object vehicle keeps the current behavior on the basis of the object vehicle information obtained at step S2000 and the relative positions between the object vehicle and the another vehicle obtained at step S6310. This calculated distance is referred to as "closest distance" hereinafter.

At step S6330, on the basis of the closest distance calculated at step S6320, an object vehicle/another vehicle relative position risk (referred to as a relative position risk R3 hereinafter) is calculated. In this embodiment, the relative position risk R3 is determined by referring to the graph of FIG. 12 defining the relationship between the relative position risk R3 and the closest distance. As understood from this graph, the relative position risk R3 takes its maximum value when the closest distance calculated at step S6320 is smaller than a predetermined first evaluation distance ($\beta$ in FIG. 12), decreases with the increase of the closest distance when the closest distance is larger than the first evaluation distance and smaller than a predetermined second evaluation distance ($\gamma$ in FIG. 12, $\beta<\gamma$), and takes its minimum value when the closest distance is larger than the second evaluation value. That is, the relative position risk R3 is determined on the basis of the closest distance calculated at step S6320.

Thereafter, the computation proceeds to step S6400. As explained above, the object vehicle/another vehicle relative-position-risk-estimation computation calculates the closest distance which is a distance between the object vehicle and another vehicle when they approach most closely to each other on the basis of the relative positions between the object vehicle and another vehicle, and calculates the relative position risk R3 from the calculated closest distance.

Figure 13:
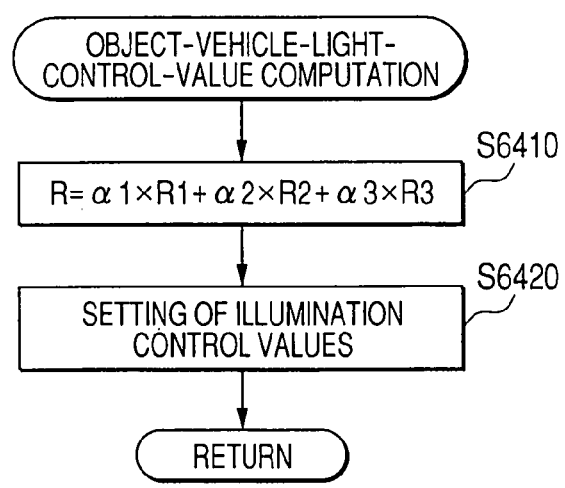
FIG. 13 is a flowchart showing control steps of an object-vehicle-light-control-value computation included in the object-vehicle-state-annunciation-light-control computation shown in FIG. 6.

Next, explanation is made as to the object-vehicle-light-control-value computation. FIG. 13 is a flowchart showing control steps of the object-vehicle-light-control-value computation.

This object-vehicle-light-control-value computation begins by calculating, at step S6410, a comprehensive risk R indicating the value of the possibility of occurrence of an accident with the object vehicle on the basis of the motion state risk R1 calculated by the object-vehicle-motion-state-risk-estimation computation, the motion prediction risk R2 calculated by the object-vehicle-motion-prediction-risk-estimation computation, and the relative position risk R3 calculated by the object vehicle/another vehicle relative-position-risk-estimation computation.

In this embodiment, the comprehensive risk R is calculated by performing an weighting addition of the motion state risk R1, the motion prediction risk R2, and the relative position risk R3.

Weighting factors of the risks R1, R2, R3 are fixed values. When the weighting factors of the risks R1, R2, R3 are represented by α1, α2, α3, they satisfy the relationship of α1>α2>α3.

At step S6420, there is set the illumination control value (s_host) which is used to control a driving amount of an actuator and a driving current of the light 5L or 5R, to thereby control the emission angle of the illumination light in the vehicle height direction, and the illumination intensity.

In this embodiment, the comprehensive risk R and the illumination control value (s_host) are in such a relationship that the emission angle in the vehicle height direction increases (to become a high beam angle in this embodiment) and the luminous intensity becomes high with the increase of the comprehensive risk R. As explained above, the illumination control value (s_host) is determined from the comprehensive risk R calculated at step S6410.

Thereafter, the light control process proceeds to step S7000. Next, explanation is made as to the light-control-arbitration computation performed at step S7000.

This light-control-arbitration computation begins by setting a final illumination target on the basis of the priorities respectively given to the first illumination target (s_risk), the second illumination target (s_driving), and the third illumination target (s_ability).

In this embodiment, of the first, second, and third illumination targets, the one given the largest priority is determined to be the final illumination target.

In more detail, the light control process selects the final illumination target from among the first illumination target (s_risk) set by the risk-area-light-control computation, the second illumination target (s_driving) set by the intended-driving-direction-light-control computation, and the third illumination target (s_ability) set by the drivable-area-light-control computation for each of the lights 5L, 5R, and controls the swivel angle so that the illumination light is emitted to the direction of the final illumination target. The light control process also adjusts the angle of the illumination light in the vehicle height direction, and the illumination intensity in accordance with the illumination control value (s_host) set by the object-vehicle-state-annunciation-light-control computation.

Next, an example of the operation of the vehicle light control system 1 is explained.

In the following explanation, the priorities given to the first illumination target, second illumination target, and third illumination target are respectively referred to as a first priority, a second priority, and a third priority. The vehicle light control system 1 sets the first priority larger than the second and third priorities for each of the lights 5L, 5R in a case where the object vehicle is driving straight to pass through a crossroad intersection not provided with a traffic light. Therefore, in such a case, the first illumination target becomes the final illumination target for each of the lights 5L, 5R.

Accordingly, if the illumination candidate point of the light 5L is an intersection entrance of the crossing road existing on the left side of the object vehicle, and the illumination candidate point of the light 5R is the driving road of the object vehicle, these points are illuminated respectively. And as the object vehicle approaches near a center of the intersection, the crossing road is illuminated far from the intersection.

The vehicle light control system 1 sets the first priority larger than the second and third priorities for each of the lights 5L, 5R also in a case where the object vehicle is driving straight to pass through a T-shaped intersection, and an intersection entrance of the crossing road exists on the right side of the driving direction of the object vehicle.

Accordingly, in this case, if the illumination candidate point of the light 5R is the intersection entrance of the crossing road existing on the right side of the object vehicle, and the illumination candidate point of the light 5L is the driving road of the object vehicle, these points are illuminated respectively. And when the object vehicle proceeds near a center of the intersection, an intersection entrance of the driving road of the object vehicle is illuminated far from the intersection.

The vehicle light control system 1 sets the first priority larger than the second and third priorities for each of the lights 5L, 5R also in a case where the object vehicle is turning right at a crossroad intersection where the accident occurrence rate is higher than a predetermined threshold.

Accordingly, in this case, if the illumination candidate point of the light 5L is an oncoming lane, and the illumination candidate point of the light 5R is an intersection entrance of the crossing road, these points are illuminated respectively.

The vehicle light control system 1 sets the second priority larger than the first and third priorities for each of the lights 5L, 5R in a case where the object vehicle is side-slipping or drifting. In this case, a position of the object vehicle three seconds after the current time is predicted, and the illumination light is emitted in the direction to this predicted position.

Figure 16:
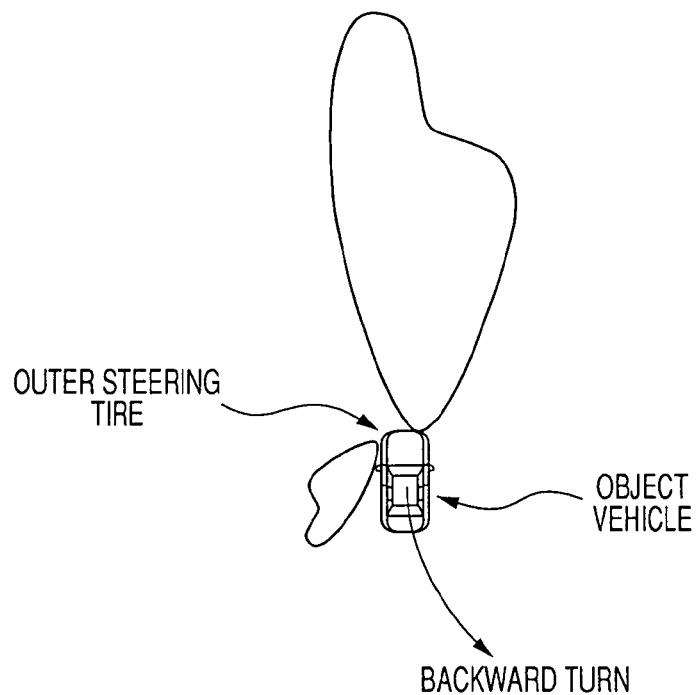

The vehicle light control system 1 sets the second priority larger than the first and third priorities for each of the lights 5L, 5R (that is, the increase values of the first priority and the third priority are made larger than the difference between the second reference value and the first reference value) in a case where the object vehicle is making a backward left turn to be parked. In this case, the illumination light is emitted in the direction of travel of an outer steering tire of the object vehicle (see FIG. 16). Accordingly, in this case, the illumination light is emitted outside the locus of the outer steering tire of the object vehicle.

In a case where there exists an obstacle on the driving road ahead of the object vehicle, the vehicle light control system 1 sets the third priority larger than the first and second priorities so that the collision avoidable area is illuminated to avoid collision with the obstacle.

The above described embodiment offers the following advantages.

As explained above, the vehicle light control system 1 of this embodiment determines the final illumination target in accordance with the priorities given to the first, second and third illumination targets, and emits the illumination light to the direction of the final illumination target. This makes it possible for a vehicle to emit the illumination light in a direction which the driver of the vehicle should pay attention wide under wide-ranging conditions. Accordingly with the vehicle light control system 1, which enables the driver to recognize conditions at a position which the driver should pay attention before the vehicle reaches this position, the value of possibility of occurrence of accident with the vehicle during night driving can be reduced.

Figure 14A:
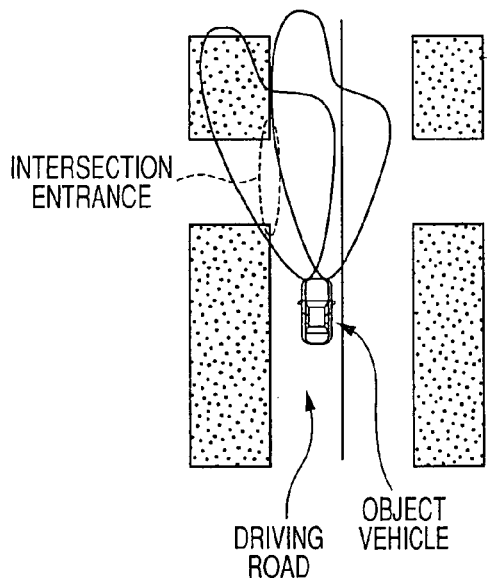
FIGS. 14A to 14D, 15, 16, and 17 are diagrams schematically showing directions in which illumination lights are emitted from the object vehicle.

When the object vehicle is driving straight to pass through an crossroad intersection not provided with a traffic light, the vehicle light control system 1 sets an intersection entrance of a crossing road as an illumination target(see FIG. 14A).

Figure 14B:
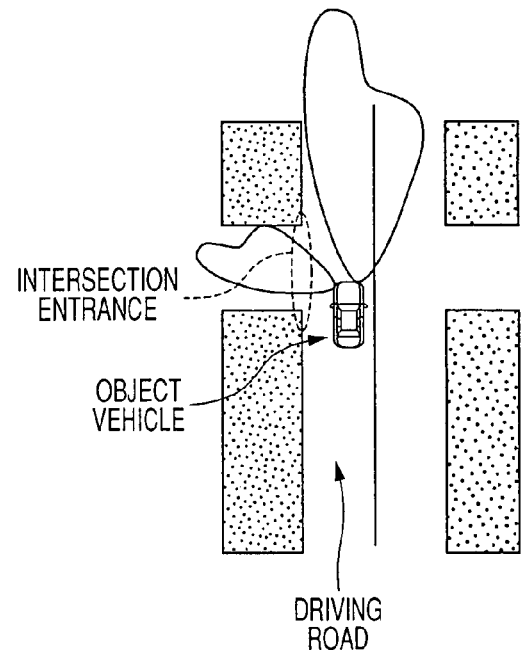

Accordingly the driver of the object vehicle can recognize existence of another vehicle or pedestrians entering the intersection before the Object vehicle enters the intersection. In addition, since the direction in which the illumination light is emitted is shifted from the intersection entrance to the crossing road as the object vehicle approaches a center of the intersection, a driver of another vehicle or pedestrians moving toward the intersection entrance can easily recognize the existence of the object vehicle (see FIG. 14B).

Figure 14C:
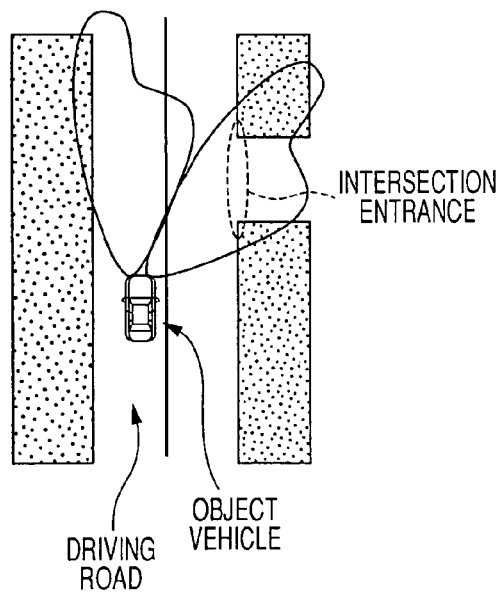

In a case where the object vehicle is driving straight to pass through a T-shaped intersection where an intersection entrance of the crossing road exists on the right side of the driving direction of the object vehicle, the vehicle light control system 1 sets the first priority larger than the second and third priorities for each of the lights 5L, 5R. Accordingly, in this case, the light 5R illuminates the intersection entrance of the crossing road, and the light 5L illuminates the driving road of the object vehicle so that a driver of another vehicle or pedestrians can easily recognize the existence of the object vehicle (see FIG. 14C).

Figure 14D:
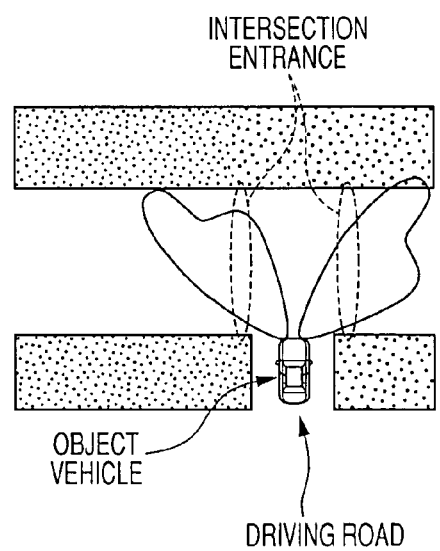

In a case where the object vehicle is entering, after making a temporarily stop, from a non-priority road to a priority road at a T-shaped intersection as shown in FIG. 14D, if the risk degree given to the intersection entrances of the priority road is set large, these intersection entrances are illuminated by the lights 5L, 5R so that a driver of another vehicle driving on the priority road can easily recognize the existence of the object vehicle.

For such reasons, the vehicle light control system 1 enables reducing crossing collision accidents in intersections.

Figure 15:
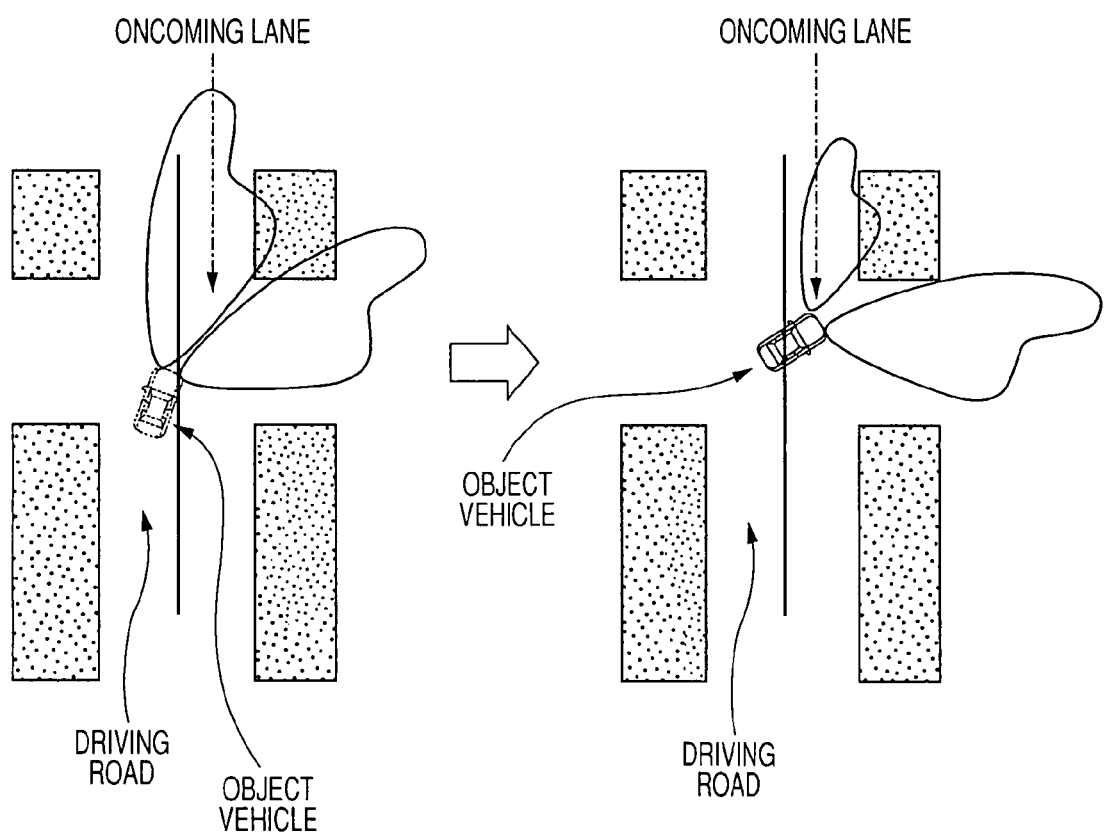

When the object vehicle makes a right turn at an intersection where the accident occurrence rate is higher than a predetermined threshold, an oncoming lane is set as a illumination target of the light 5L, and an intersection entrance of the crossing road to which the object vehicle is driving is set as an illumination target of the light 5R (see FIG. 15).

This makes it possible to enable the driver of an oncoming vehicle to easily recognize that the object vehicle is making a right turn, or waiting to make a right turn, or the object vehicle is in the intersection to which the oncoming vehicle is about to enter, because the oncoming lane and the intersection entrance are illuminated. Accordingly, with the vehicle light control system 1, collision accidents between a right turn vehicle and an oncoming vehicle can be reduced.

As described above, the vehicle light control system 1 properly selects the first illumination target from among the intersection entrance, oncoming lane, the driving road of the object vehicle, etc. which have been set as illumination points by the risk-area-light-control computation, and determines the selected first illumination target to be the final illumination target if the first priority is larger than the other priorities to reduce accidents around the intersection.

The vehicle light control system 1 sets the driving direction of the object vehicle as the second illumination target by the intended-driving-direction-light-control computation, so that the driver of the object vehicle can recognize conditions in the driving direction of the object vehicle at an early time.

When the object vehicle makes a backward turn, the vehicle light control system 1 sets the direction of travel of its outer steering tire as the second illumination target. Accordingly, at this time, the illumination light is emitted outside the locus of the outer steering tire of the object vehicle (see FIG. 16). This makes it possible to enable the driver of the object vehicle to recognize that there is a body (human, for example) outside the outer steering tire of the object vehicle, and also enable this body to recognize the existence of the object vehicle making a backward turn. Accordingly, with the vehicle light control system 1, accidents when the object vehicle makes a backward turn, or when the object vehicle is being parked can be reduced.

When the object vehicle is side-slipping or drifting, the illumination light is emitted in the direction to a position at which the object vehicle is predicted to exist three seconds after the current time. Accordingly, with the vehicle light control system 1, it is possible to enable the driver of the object vehicle to recognize conditions of the predicted future position of the object vehicle even when the object vehicle is side-slipping or drifting.

Figure 17:
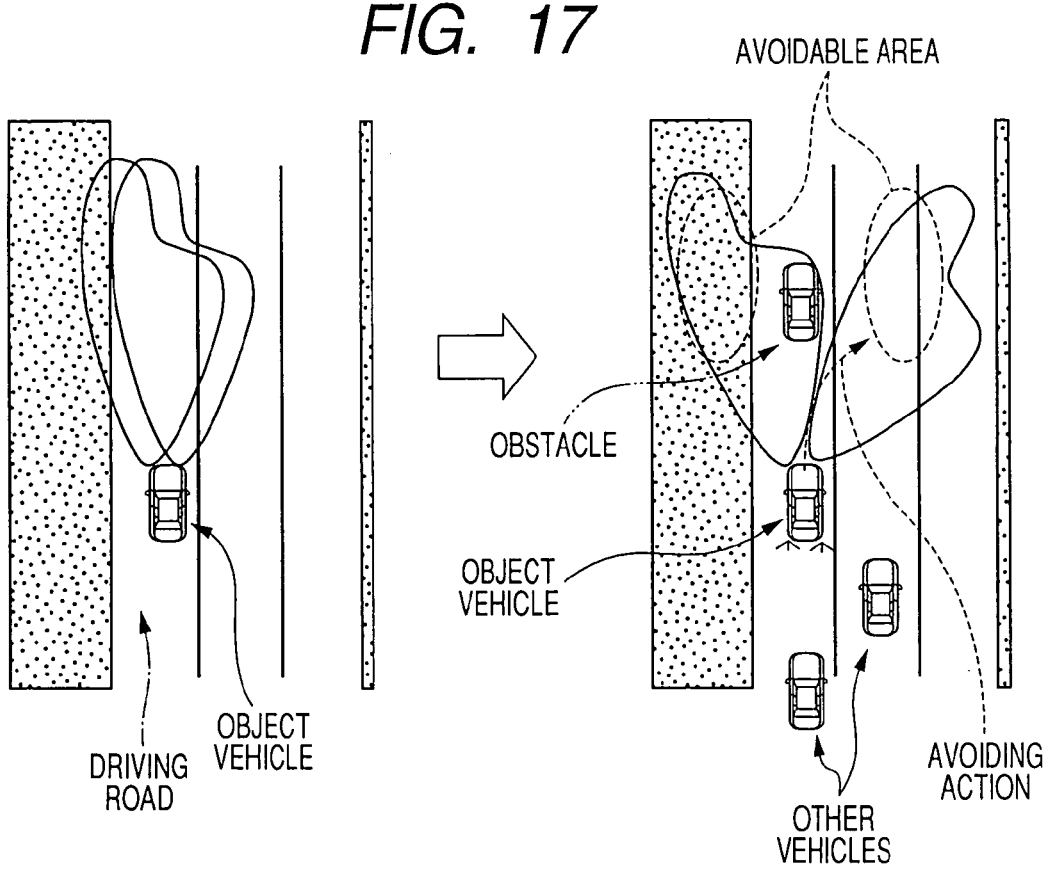

When there exists an obstacle ahead of the object vehicle driving forward, the illumination light is emitted in the direction to the collision avoidable area. Accordingly, with the vehicle light control system 1, it is possible to enable the driver of the object vehicle to recognize conditions of the collision avoidable area before the object vehicle moves to this collision avoidable area, and to enable a body (another vehicle, or a pedestrian) to recognize that the object vehicle is taking an avoidance behavior, as a consequence of which affection on the traffic flow can be suppressed (see FIG. 17).

When the navigation system 31 is advising a direction change, the vehicle light control system 1 sets an advised direction as the third illumination target. This makes it possible to enable the driver of the object vehicle to recognize conditions of the advised direction, and to enable a driver of another vehicle to recognize that the object vehicle is intending to change directions.

Accordingly, with the vehicle light control system 1, accidents due to direction change can be reduced. The vehicle light control system 1 adjusts the illumination light emitting aspects, that is, the angle of the illumination light in the vehicle height direction, and the illumination intensity in accordance with the behavior of the object vehicle. This make it possible to inform a driver of another vehicle of the behavior of the object vehicle, so that the driver of another vehicle or pedestrian can recognize the existence and behavior of the object vehicle and take an action to avoid the object vehicle.

The vehicle light control system 1 adjusts the illumination light emitting aspects also in accordance with the speed, acceleration, or depression amount of the accelerator pedal. This makes it possible to let the driver of another vehicle or pedestrians know that the object vehicle is approaching so that the driver of another vehicle or pedestrians can take avoidance behavior at an early time.

The vehicle light control system 1 adjusts the illumination light emitting aspects also in accordance with the manipulation of the brake pedal. This makes it possible to let the driver of another vehicle know that no brake is applied to the object vehicle and there is a danger of an accident.

The vehicle light control system 1 adjusts the illumination light emitting aspects also in accordance with the relative positions between the object vehicle and another vehicle. This makes it possible to let a driver of another vehicle or pedestrians know the existence of the object vehicle and the positional relationship with the object vehicle, so that so that the driver of another vehicle or pedestrians can take avoidance behavior at an early time.

Other Embodiments

It is a matter of course that various modifications can be made to the above described embodiment.

For example, although vehicle light control system 1 has been described to obtain the intersection information from the navigation system 31, it may be obtained from a road side terminal by radio. The vehicle light control system 1 has been described to recognize conditions around the object vehicle on the basis of the ambient condition information obtained from the ambient picture recognition section 32a, and the target information obtained from the vehicle condition recognition section 32b. However, it may be obtained by inter-vehicle communication or from a road side terminal by radio.

In this embodiment, the collision risk is calculated from the information indicating whether or not the intersection in question is provided with a traffic light, how this intersection is configured, what the accident ratio at this intersections is, whether the driving road of the object vehicle is a priority road or a non-priority road, etc. However, any information can be used to calculate the collision risk, if it provides a positional relationship between the object vehicle and another vehicle driving on a crossing road, and the probability of accident occurrence at the intersection in question.

The risk-area-light-control computation has been described to select, as the illumination points, intersection entrances, an oncoming lane, a position at which a crosswalk enters the intersection in question, the driving road of the object vehicle, etc., however they are not limited thereto. For example, a sidewalk may be selected as a illumination point when a pedestrian is on the sidewalk.

The risk-area-light-control computation has been described to determine the illumination candidate point from among the illumination points on the basis of the relative positions, relative relationship, and the collision risk. However, the position of the illumination candidate point may be determined in advance for each intersection, or may be determined while the object vehicle is driving on the basis of the ambient condition information or the target information. In short, any method may be used to determine the illumination candidate point if it enables determining a position having the largest collision risk at the intersection in question as the illumination candidate point.

The intended-driving-direction-light-control computation has been described to set, when the object vehicle makes a backward turn, the direction of travel of its outer steering tire as the second illumination target. However, when the object vehicle makes a backward turn, a predetermined angle may be set as a swivel angle so that a prespecified direction is set as the second illumination target. In short, the second illumination target may be set to any direction if the illumination light is emitted outside the locus of the outer steering tire of the object vehicle.

The intended-driving-direction-light-control computation has been described to set, when the object vehicle is being parked and its steering wheel is being manipulated, the direction of travel of its steering tire as the second illumination target. However, the second illumination target may be set to a direction determined on the basis of information regarding the road on which the object vehicle is running. In short, the second illumination target may be set to any direction if the illumination light is emitted in a direction in which the object vehicle is predicted to drive.

The intended-driving-direction-light-control computation has been described to predict a future position of the object vehicle three seconds after the current time regardless of whether or not the object vehicle is side-slipping when the object vehicle is driving forward. However, the future position of the object vehicle to be predicted is not limited to the position at which the object vehicle is estimated to be three seconds after the current time. If the object vehicle is not side-slipping, the direction of travel of the steering tires of the object vehicle may be set as the second illumination target. Information regarding around the object vehicle (information regarding a road shape, for example) obtained from the navigation system 31 may be used instead of the index R to set the second illumination target.

The vehicle light control system 1 may be so configured that the ambient picture recognition section 32a performs image analysis in the direction in which the illumination light is emitted when the object vehicle is side-slipping, and if this analysis shows that there exists an obstacle (utility pole, for example) which the object vehicle may collide with, a pre-crash system is activated.

Such a configuration can reduce the possibility of the driver and passengers of the object vehicle being injured even if an accident happens.

The vehicle light control system 1 has been described to set a roadside of the driving road of the object vehicle as the collision avoidable area when there is an obstacle on a cruising lane in a case where the driving road is not provided with a guard rail, and no vehicle is there, and set a passing lane as the collision avoidable area in other cases. However, the vehicle light control system 1 may be so configured that when another vehicle exists around the obstacle or on the lateral side of the object vehicle (that is, on the cruising lane), it recognizes the roadside as the collision avoidable area, or it stops recognition of the collision avoidable area.

Although the intended-driving-direction-light-control computation has been described to recognize an obstacle from the ambient condition information or target information, it may be so configured as to recognize an obstacle on the basis of information received by inter-vehicle communication, or information received from a roadside terminal.

Although the object-vehicle-motion-state-risk-estimation computation has been described to calculate the motion state risk $R1$ from the speed and acceleration of the object vehicle, it may by calculated from another parameter such as the yaw rate of the object vehicle.

Although the object-vehicle-motion-state-risk-estimation computation has been described to determine a larger one of the speed risk and the acceleration risk to be the motion state risk $R1$, it may be determined by performing weighting addition of them, or determined from weighted average values of them.

Although the object-vehicle-motion-state-risk-estimation computation has been described to determine the motion prediction risk $R2$ from the manipulation amounts of the accelerator pedal and the brake pedal, and the shift position of the object vehicle, it may determined from other indicators such as a manipulation amount of the steering wheel (steering angle).

Although the object-vehicle-motion-state-risk-estimation computation has been described to determine a larger one of the accelerator prediction risk, the brake prediction risk, and the shift prediction risk to be the motion prediction risk $R2$, it may be determined by performing a weighting addition of them, or determined from weighted average values of them.

In this embodiment, the weighting factors given to the motion state risk $R1$, the motion prediction risk $R2$, and the relative position risk $R3$ used in the object-vehicle-light-control-value computation are fixed values, however, they may be varied if the comprehensive risk R derived from these risks $R1$, $R2$, $R3$ increases with the increase of probability of accident occurrence.

Although the object-vehicle-light-control-value computation has been described to calculate the comprehensive risk R by performing a weighting addition of the motion state risk $R1$, the motion prediction risk $R2$, and the relative position risk $R3$, it may be determined from weighted average values of them, or may be determined on the basis of the largest one of them.

The object-vehicle-state-annunciation-light-control computation has been described to set the illumination control values for controlling the angle of the illumination light in the vehicle height direction, and the illumination intensity. However, the object-vehicle-state-annunciation-light-control computation may set only one of these control values. Furthermore, the object-vehicle-state-annunciation-light-control computation may set another control value to control the color of the illumination light when the lights 5 are capable of emitting the illumination light in a plurality of different colors, or to control the intensity distribution pattern of the illumination light.

The vehicle light control system 1 may be configured to oscillate or increase the swivel angles of the lights 5 depending on the yaw rate of the object vehicle. This configuration enables another vehicle or a pedestrian to take action to avoid the object vehicle at an early time when the yaw rate of the object vehicle is large, for example, when the object vehicle is turning.

The vehicle light control system 1 has been described to calculate the priority of each of the first and second illumination targets by adding the first reference value to the increase value, however, the calculation method of the priority is not limited thereto. For example, it may be calculated by adding or subtracting the value of the third priority to and from the value of the first priority depending on each of the risks R1, R2, R3 calculated by the object-vehicle-state-annunciation-light-control computation. A specific one of the first to third priorities may be made the largest or smallest depending on the conditions of the object vehicle.

In short, the priorities given to the first to third illumination targets may be calculated by any method, if a position at which the probability of accident occurrence is high is selected as the final illumination target. The vehicle light control system 1 has been described to select, as the final illumination target, one of the first to third illumination targets, which has the largest priority, however, the selection method of the final illumination target is not limited thereto. For example, the final illumination target may be determined by merging the first to third illumination targets.

In the above described embodiment, the illumination light is emitted to the direction of the illumination target by swivel-controlling the lights 5. However, the illumination target can be illuminated also by widening the emission angle of the illumination light. However, in this case, it is necessary to perform an emission angle adjusting control in which an emission lens is deposed on a light path at the timing of emission of the illumination light.

Although the number of the light sources controlled by the vehicle light control system 1 is two in the above described embodiment, it may be 4 or 6. The lights 5 controlled by the light-control ECU 10 are headlights in the above described embodiment, however the control target of the light-control ECU 10 is not limited to headlights. For example, the light-control ECU 10 may be used to control turn signal lights or brake lamps mounted on a vehicle. Furthermore, it is possible to provide a vehicle with a plurality of extra lights at the sides or the rear of the vehicle which are controlled by the vehicle light control system 1 such that at least one light to illuminate an illumination target is selected from the plurality of extra lights depending on the direction to the illumination target.

The above explained preferred embodiments are exemplary of the invention of the present application which is described solely by the claims appended below. It should be understood that modifications of the preferred embodiments may be made as would occur to one of skill in the art.

What is claimed is:

1. A vehicle light control system comprising:
   a light device emitting an illumination light around an object vehicle on which said vehicle light control system is mounted;
   an information obtaining device obtaining integrated information including at least vehicle information indicating a behavior of said object vehicle;
   a control unit including an illumination target candidate setting function of setting a plurality of illumination target candidates which a driver of said object vehicle should pay attention to on the basis of said integrated information, said plurality of said illumination target candidates being given a risk degree respectively, and a determination function of selecting an illumination target from among said plurality of said illumination target candidates on the basis of said risk degree; and
   an actuator device controlling said light device such that said illumination light is emitted in a direction of travel of said object vehicle and in a direction of said illumination target different from the direction of travel; wherein
   said information obtaining device includes a vehicle information obtaining device obtaining said vehicle information, and a direction-change-information obtaining device obtaining direction change information including at least information indicating a new direction to which said vehicle can change, said integrated information being constituted by said vehicle information and said lane change information, said illumination target candidate setting function determines said new direction as one of said illumination target candidates when said integrated information indicates that said object vehicle is intending to change directions; and
   said direction-change-information obtaining device includes an obstacle detecting function of detecting an obstacle existing on said driving road, and an avoidable area detecting function of detecting an avoidable area to avoid said obstacle, and is configured to set said avoidable area detected by said avoidable area detecting function as said new direction.

2. The vehicle light control system according to claim 1, wherein said information obtaining device includes an intersection information obtaining device obtaining intersection information indicating at least a position and a configuration of an intersection on a driving road which said vehicle is driving on, said integrated information being constituted by said vehicle information and said intersection information.

3. The vehicle light control system according to claim 2, wherein said illumination target candidate setting function is configured to set, as one of said illumination target candidates, a direction in which there exists an intersection entrance of a crossing road with which said driving road intersects at said intersection, when said integrated information indicates that said object vehicle has entered an area predetermined for said intersection.

4. The vehicle light control system according to claim 3, wherein, when said integrated information indicates that said object vehicle has entered said predetermined area, said illumination target candidates set by said illumination target candidate setting function are respectively given said risk degree determined depending on at least one of said configuration of said intersection, priorities of said driving road and said crossing road, and a speed of said object vehicle.

5. The vehicle light control system according to claim 3, wherein, when said integrated information indicates that said object vehicle is making or intending to make a right turn in said intersection, said illumination target candidate setting function sets a direction of an oncoming lane of said driving road as one of said illumination target candidates.

6. The vehicle light control system according to claim 1, wherein, when said integrated information indicates that a speed of said object vehicle is lower than a predetermined speed, said illumination target candidate setting function sets a direction of travel of steering tires of said object vehicle as one of said illumination target candidates.

7. The vehicle light control system according to claim 1, wherein, when said integrated information indicates that a speed of said object vehicle is higher than a predetermined speed, said illumination target candidate setting function sets a direction of a future prediction position at which said object vehicle is predicted to be a predetermined time after a current time as one of said illumination target candidates.

8. The vehicle light control system according to claim 7, wherein, when said integrated information indicates that said object vehicle is side-slipping, said illumination target candidate setting function determines said future position on the basis of a direction in which said object vehicle is side-slipping.

9. The vehicle light control system according to claim 7, wherein, when said integrated information indicates that said object vehicle is not side-slipping, said illumination target candidate setting function determines said future position on the basis of steering information included in said integrated information and indicating a steering angle of said object vehicle and a driving direction of said object vehicle.

10. The vehicle light control system according to claim 9, wherein, when said integrated information indicates that said object vehicle is making a backward turn, said illumination target candidate setting function determines, as said future position, a position at which an outer steering tire of said object vehicle is predicted to exist.

11. The vehicle light control system according to claim 1, wherein said direction-change-information obtaining device is constituted by a route setting function of a navigation system mounted on said object vehicle.

12. The vehicle light control system according to claim 1, wherein said illumination target candidate setting function is configured to set, as said one of illumination target candidates, a direction in which there is a possibility that there exists a body with which said object vehicle may collide.

13. The vehicle light control system according to claim 1, wherein said illumination target candidate setting function is configured to set, as said one of illumination target candidates, a direction in which there is a possibility that there exists a body moving toward said object vehicle.

14. The vehicle light control system according to claim 1, wherein said light device is a headlight device including at least two light sources, said actuator device controlling at least one of said light sources.

15. The vehicle light control system according to claim 1, wherein said actuator device is configured to control at least one of a light axis of said headlight device in a vehicle width direction, and an emission angle of said illumination light in a vehicle height direction.

16. The vehicle light control system according to claim 1, wherein said actuator device is configured to vary intensity of said illumination light depending on said risk degree given to said illumination target selected by said determination function.

* * * * *

UNITED STATES PATENT AND TRADEMARK OFFICE
CERTIFICATE OF CORRECTION

| | | |
|---|---|---|
| PATENT NO. | : 7,791,459 B2 | Page 1 of 1 |
| APPLICATION NO. | : 11/906552 | |
| DATED | : September 7, 2010 | |
| INVENTOR(S) | : Eiji Teramura et al. | |

It is certified that error appears in the above-identified patent and that said Letters Patent is hereby corrected as shown below:

Title Page,   (30) Foreign Application Priority Data:

"(JP) 2006-274144" should be --(JP) 2006-275144--

Signed and Sealed this

Twenty-first Day of December, 2010

David J. Kappos
*Director of the United States Patent and Trademark Office*